United States Patent
Widener

(10) Patent No.: US 10,753,208 B2
(45) Date of Patent: Aug. 25, 2020

(54) AIRFOILS INCLUDING PLURALITY OF NOZZLES AND VENTURI

(71) Applicant: General Electric Company, Schenectady, NY (US)

(72) Inventor: Stanley Kevin Widener, Greer, SC (US)

(73) Assignee: General Electric Company, Schenectady, NY (US)

(*) Notice: Subject to any disclaimer, the term of this patent is extended or adjusted under 35 U.S.C. 154(b) by 144 days.

(21) Appl. No.: 16/205,931

(22) Filed: Nov. 30, 2018

(65) Prior Publication Data

US 2020/0173289 A1 Jun. 4, 2020

Related U.S. Application Data

(63) Continuation-in-part of application No. 16/205,799, filed on Nov. 30, 2018.

(51) Int. Cl.
*F01D 5/18* (2006.01)

(52) U.S. Cl.
CPC ............. *F01D 5/186* (2013.01); *F01D 5/188* (2013.01); *F05D 2220/32* (2013.01);
(Continued)

(58) Field of Classification Search
CPC .......... F01D 5/186; F01D 5/187; F01D 5/188; F01D 5/189; F01D 5/18; F05D 2260/20;
(Continued)

(56) References Cited

U.S. PATENT DOCUMENTS

| 4,278,400 A | 7/1981 | Yamarik et al. |
| 4,330,235 A | 5/1982 | Araki |

(Continued)

FOREIGN PATENT DOCUMENTS

| DE | 19727407 A1 | 1/1999 |
| EP | 0626036 B1 | 10/1996 |

(Continued)

OTHER PUBLICATIONS

Extended European Search Report and Opinion issued in connection with corresponding EP Application No. 19211669.7 dated Apr. 9, 2020, 7 pages.

*Primary Examiner* — Richard A Edgar
(74) *Attorney, Agent, or Firm* — James Pemrick; Hoffman Warnick LLC

(57) ABSTRACT

Airfoils including a plurality of nozzles and venturi. The airfoils may include a body including an inner wall defining a high pressure fluid chamber, and a plurality of high pressure nozzles extending through the inner wall. Each high pressure nozzle may be in fluid communication with the high pressure fluid chamber. The airfoil body may also include an intermediate wall positioned adjacent to and surrounding the inner wall to define a low pressure fluid chamber formed between the intermediate wall and the inner wall, and a plurality of low pressure venturi extending through the intermediate wall. Each low pressure venturi may be in fluid communication with the low pressure fluid chamber. Additionally, the airfoil body may include an outer wall positioned adjacent to and surrounding the intermediate wall to define a cooling channel formed between the intermediate wall and the outer wall.

20 Claims, 22 Drawing Sheets

(52) U.S. Cl.
   CPC .... *F05D 2240/30* (2013.01); *F05D 2260/202* (2013.01); *F05D 2260/232* (2013.01)

(58) Field of Classification Search
   CPC ......... F05D 2260/201; F05D 2260/202; F05D 2260/204; F05D 2260/221
   See application file for complete search history.

(56) References Cited

U.S. PATENT DOCUMENTS

| | | |
|---|---|---|
| 4,573,865 A | 3/1986 | Hsia et al. |
| 7,162,876 B2 | 1/2007 | Hoff et al. |
| 7,238,001 B2 | 7/2007 | Rushton |
| 8,550,774 B2 | 10/2013 | Maltson |
| 8,726,672 B2 | 5/2014 | Ciofini et al. |
| 10,309,228 B2 * | 6/2019 | Dutta .................... F01D 5/189 |
| 2015/0300266 A1 | 10/2015 | Glahn et al. |
| 2017/0356299 A1 | 12/2017 | Dutta et al. |

FOREIGN PATENT DOCUMENTS

| | | |
|---|---|---|
| EP | 2180162 B1 | 12/2015 |
| EP | 1440223 B2 | 11/2017 |
| EP | 3146184 B1 | 3/2018 |

\* cited by examiner

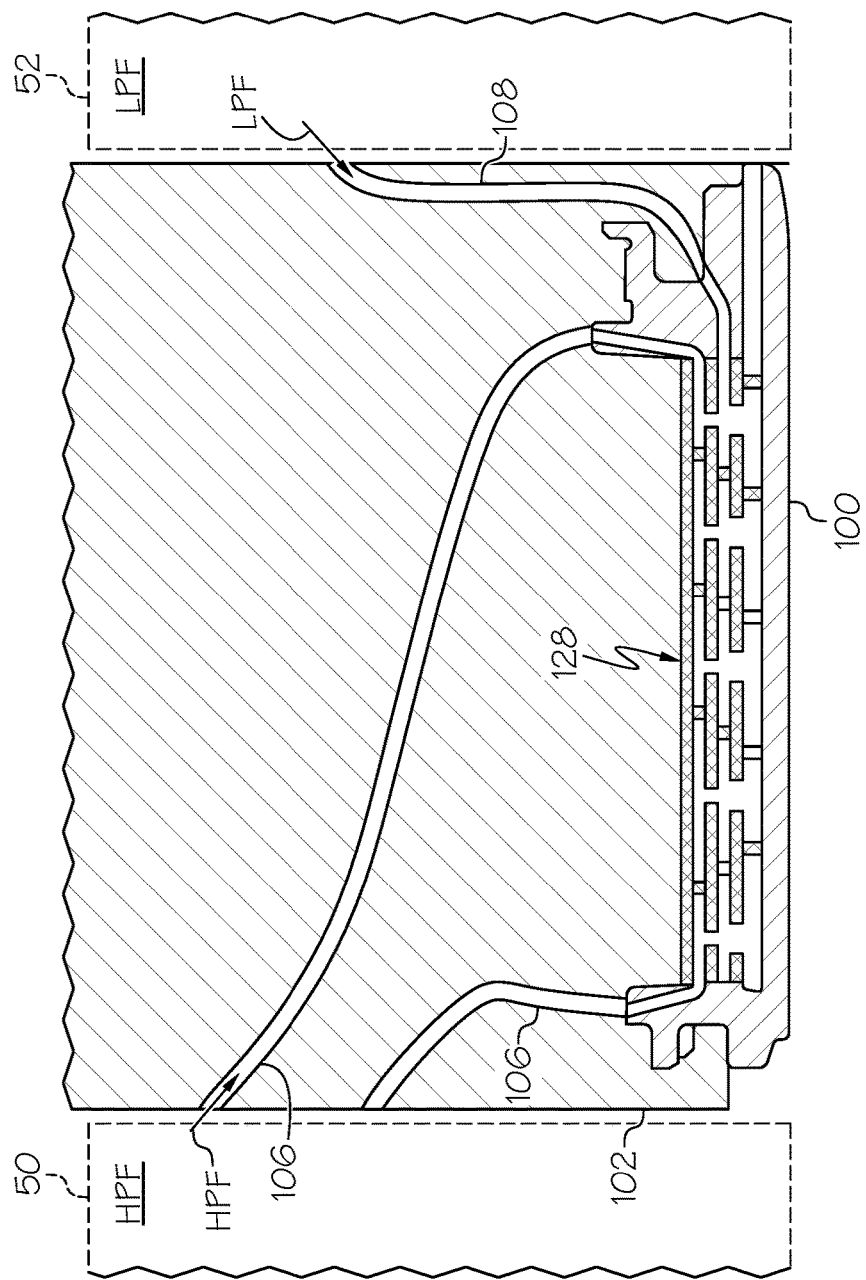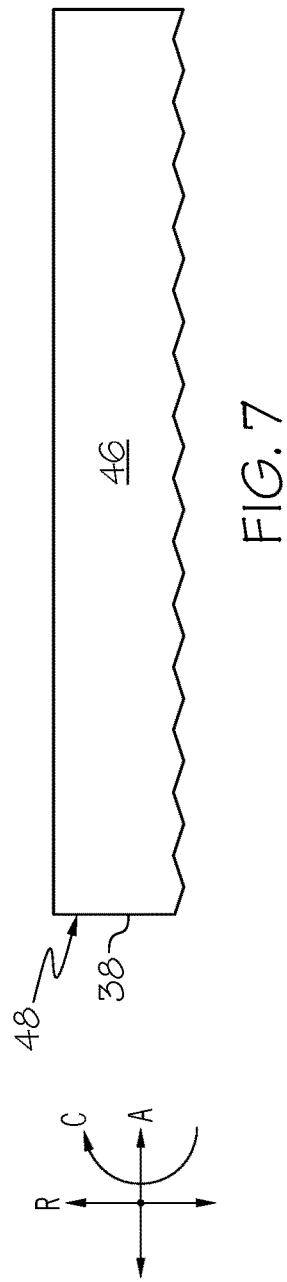
FIG. 7

AIRFOILS INCLUDING PLURALITY OF NOZZLES AND VENTURI

BACKGROUND OF THE INVENTION

The disclosure relates generally to hot gas path components for turbine systems, and more particularly, to hot gas path components formed as airfoils that include a plurality of nozzles and venturi formed therein.

Conventional turbomachines, such as gas turbine systems, generate power for electric generators. In general, gas turbine systems generate power by passing a fluid (e.g., hot gas) through a turbine component of the gas turbine system. More specifically, inlet air may be drawn into a compressor to be compressed. Once compressed, the inlet air is mixed with fuel to form a combustion product, which may be reacted by a combustor of the gas turbine system to form the operational fluid (e.g., hot gas) of the gas turbine system. The fluid may then flow through a fluid flow path for rotating a plurality of rotating blades and rotor or shaft of the turbine component for generating the power. The fluid may be directed through the turbine component via the plurality of rotating blades and a plurality of stationary nozzles or vanes positioned between the rotating blades. As the plurality of rotating blades rotate the rotor of the gas turbine system, a generator, coupled to the rotor, may generate power from the rotation of the rotor.

During operation, turbine blades and vanes, and more specifically the airfoils of each, may be exposed to high temperature operational fluids flowing through the flow path of the turbine component. Over time and/or during exposure, the airfoils of the turbine blades and vanes may undergo undesirable thermal expansion and/or operational wear. The thermal expansion of the airfoils may result in damage to and/or outages of the blades/vanes of the turbine. When the airfoils become damaged or undergo an outage event, the operational efficiency of the turbine component, and in turn the entire turbine system, may be reduced. Additionally, when an airfoil is damaged or an outage event occurs, the turbine component may need to shutdown to replace the damaged turbine blade and/or vane, resulting in no power being generated by the turbine system when the blade/vane is replaced.

To minimize thermal expansion and degradation, airfoils are typically cooled. For example, conventional airfoils typically contain an intricate maze of internal cooling passages. Cooling air (or other suitable coolant) provided by, for example, a compressor of a gas turbine system, may be passed through and out of the cooling passages to cool various portions of the airfoil for the blades and vanes. Cooling circuits formed by one or more cooling passages in these conventional airfoils may include, for example, internal, near wall cooling circuits, internal central cooling circuits, tip cooling circuits, and cooling circuits adjacent the leading and trailing edges of the airfoil.

Typically in conventional systems, only high pressure cooling air may be provided to and utilized by the airfoils for cooling. As a result, substantially all or most of the cooling air flowing through conventional gas turbine static components must be provided from high-pressure sources, which are subject to a greater quantity of compressor pumping work. Cooling air from lower-pressure sources that may otherwise be available to cool the components cannot be used if the pressure is too low. This in turn may reduce the operational efficiency of the gas turbine system, and/or may require supplemental high pressure air generation system(s) to be incorporated within the gas turbine system. Using supplemental high pressure air generation systems to provide additional high pressure air to the system thus add undesirable build, installation, maintenance, and/or operational expenses to the gas turbine system.

BRIEF DESCRIPTION OF THE INVENTION

A first aspect of the disclosure provides an airfoil including: a body including: an inner wall defining a high pressure fluid chamber; a plurality of high pressure nozzles extending through the inner wall, each of the plurality of high pressure nozzles in fluid communication with the high pressure fluid chamber; an intermediate wall positioned adjacent to and surrounding the inner wall to define a low pressure fluid chamber formed between the intermediate wall and the inner wall; a plurality of low pressure venturi extending through the intermediate wall, each of the plurality of low pressure venturi in fluid communication with the low pressure fluid chamber; and an outer wall positioned adjacent to and surrounding the intermediate wall to define a cooling channel formed between the intermediate wall and the outer wall.

A second aspect of the disclosure provides an airfoil including: a body including: a first inner wall defining a first high pressure fluid chamber; a first plurality of high pressure nozzles extending through the first inner wall, each of the first plurality of high pressure nozzles in fluid communication with the first high pressure fluid chamber; a first intermediate wall positioned adjacent to and surrounding the first inner wall to define a first low pressure fluid chamber between the first intermediate wall and the first inner wall; a first plurality of low pressure venturi extending through the first intermediate wall, each of the first plurality of low pressure venturi in fluid communication with the first low pressure fluid chamber; a second inner wall surrounding and defining a second high pressure fluid chamber, the second inner wall positioned adjacent the first inner wall; a second plurality of high pressure nozzles extending through the second inner wall, each of the second plurality of high pressure nozzles in fluid communication with the second high pressure fluid chamber; a second intermediate wall positioned adjacent to and surrounding the second inner wall to define a second low pressure fluid chamber formed between the second intermediate wall and the second inner wall; a second plurality of low pressure venturi extending through the second intermediate wall, each of the second plurality of low pressure venturi in fluid communication with the second low pressure fluid chamber; an outer wall positioned adjacent to and surrounding: the first intermediate wall to define a first cooling channel formed between the first intermediate wall and the outer wall; and the second intermediate wall to define a second cooling channel formed between the second intermediate wall and the outer wall; and a sectioning wall extending between and separating the first cooling channel and the second cooling channel, the sectioning wall surrounded by the outer wall.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 7 shows an enlarged side view of a portion of the gas turbine system of FIG. 2, according to additional embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
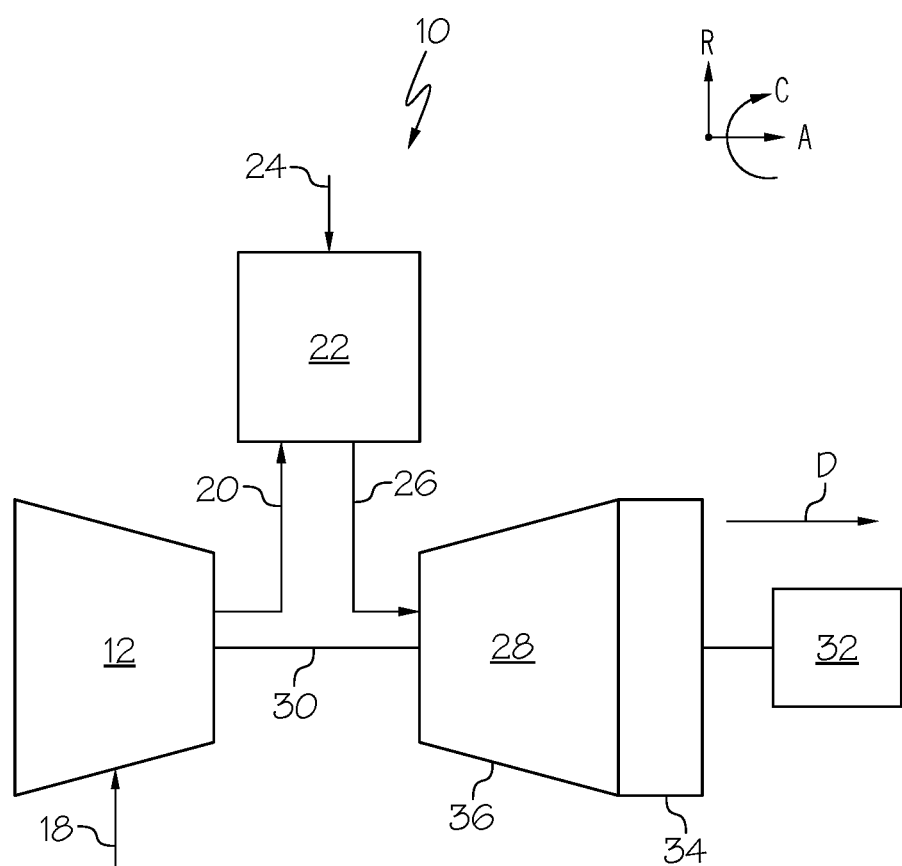
FIG. 1 shows a schematic diagram of a gas turbine system, according to embodiments of the disclosure.

As an initial matter, in order to clearly describe the current disclosure it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along a direction "R" (see, FIG. 1), which is substantially perpendicular with axis A and intersects axis A at only one location. Finally, the term "circumferential" refers to movement or position around axis A (e.g., direction "C").

As indicated above, the disclosure provides hot gas path components for turbine systems, and more particularly, to hot gas path components formed as airfoils that include a plurality of nozzles and venturi formed therein.

These and other embodiments are discussed below with reference to FIGS. 1-22. However, those skilled in the art will readily appreciate that the detailed description given herein with respect to these Figures is for explanatory purposes only and should not be construed as limiting.

FIG. 1 shows a schematic view of an illustrative gas turbine system 10. Gas turbine system 10 may include a compressor 12. Compressor 12 compresses an incoming flow of air 18. Compressor 12 delivers a flow of compressed air 20 to a combustor 22. Combustor 22 mixes the flow of compressed air 20 with a pressurized flow of fuel 24 and ignites the mixture to create a flow of combustion gases 26. Although only a single combustor 22 is shown, gas turbine system 10 may include any number of combustors 22. The flow of combustion gases 26 is in turn delivered to a turbine 28, which typically includes a plurality of turbine blades including airfoils (see, FIG. 2) and stator vanes (see, FIG. 2). The flow of combustion gases 26 drives turbine 28, and more specifically the plurality of turbine blades of turbine 28, to produce mechanical work. The mechanical work produced in turbine 28 drives compressor 12 via a rotor 30 extending through turbine 28, and may be used to drive an external load 32, such as an electrical generator and/or the like.

Gas turbine system 10 may also include an exhaust frame 34. As shown in FIG. 1, exhaust frame 34 may be positioned adjacent to turbine 28 of gas turbine system 10. More specifically, exhaust frame 34 may be positioned adjacent to turbine 28 and may be positioned substantially downstream of turbine 28 and/or the flow of combustion gases 26 flowing from combustor 22 to turbine 28. As discussed herein, a portion (e.g., outer casing) of exhaust frame 34 may be coupled directly to an enclosure, shell, or casing 36 of turbine 28.

Subsequent to combustion gases 26 flowing through and driving turbine 28, combustion gases 26 may be exhausted, flow-through and/or discharged through exhaust frame 34 in a flow direction (D). In the non-limiting example shown in FIG. 1, combustion gases 26 may flow through exhaust frame 34 in the flow direction (D) and may be discharged from gas turbine system 10 (e.g., to the atmosphere). In another non-limiting example where gas turbine system 10 is part of a combined cycle power plant (e.g., including gas turbine system and a steam turbine system), combustion gases 26 may discharge from exhaust frame 34, and may flow in the flow direction (D) into a heat recovery steam generator of the combined cycle power plant.

Figure 2:
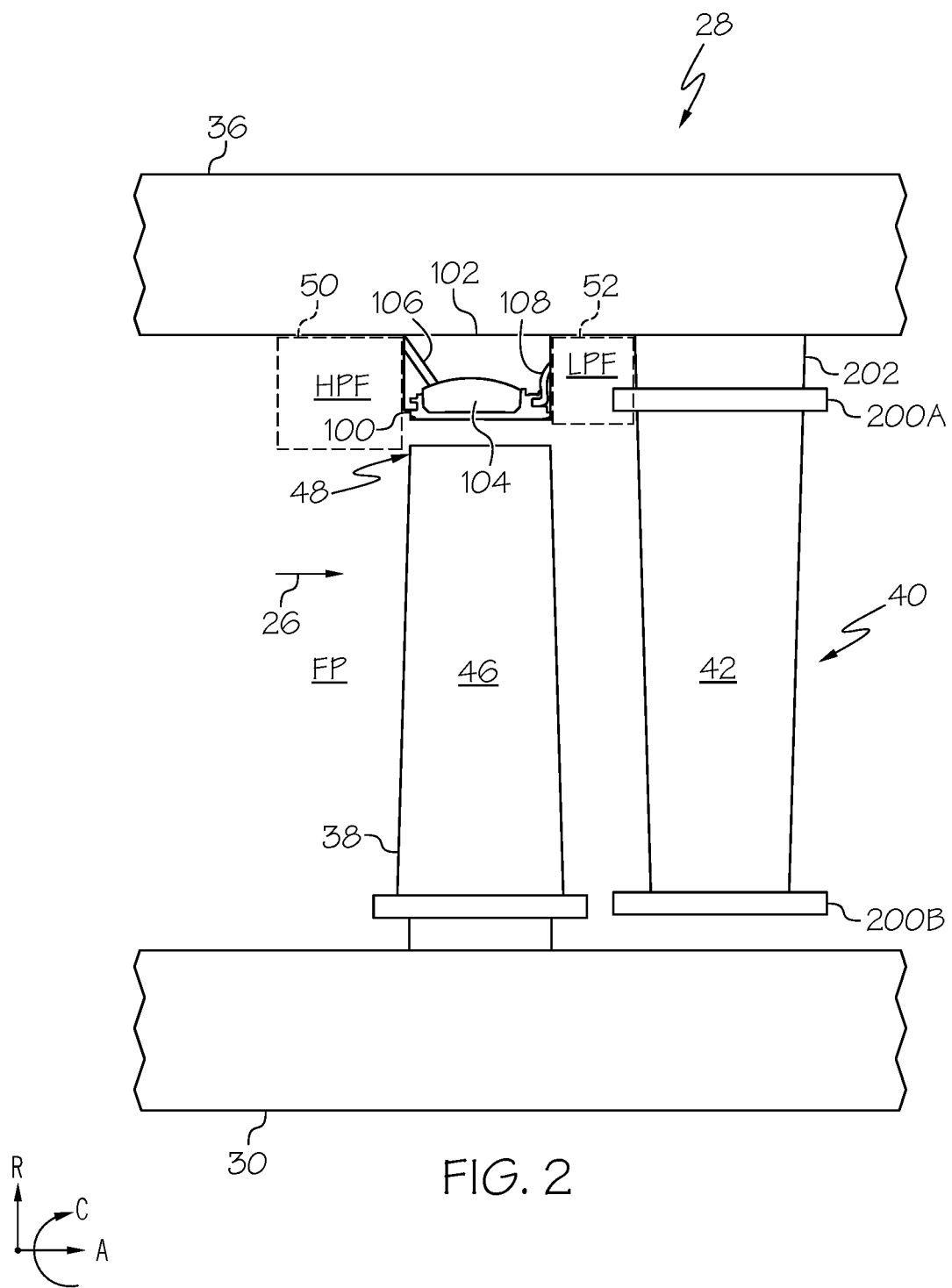
FIG. 2 shows a side view of a portion of a turbine of the gas turbine system of FIG. 1 including a turbine blade, a stator vane, a rotor, a casing, a hot gas path component, and a support, according to embodiments of the disclosure.

Turning to FIG. 2, a portion of turbine 28 is shown. Specifically, FIG. 2 shows a side view of a portion of turbine 28 including a stage of turbine blades 38 (one shown), and a stage of stator vanes 40 (one shown) positioned within casing 36 of turbine 28. As discussed herein, each stage (e.g., first stage, second stage (not shown), third stage (not shown)) of turbine blades 38 may include a plurality of turbine blades 38 that may be coupled to and positioned circumferentially around rotor 30 and may be driven by combustion gases 26 to rotate rotor 30. Additionally, each stage (e.g., first stage, second stage (not shown), third stage (not shown)) of stator vanes 40 may include a plurality of stator vanes that may be coupled to and/or positioned circumferentially about casing 36 of turbine 28. In the non-limiting example shown in FIG. 2, stator vanes 40 may include a plurality of hot gas path (HGP) components 200. For example, HGP components 200 of stator vanes 40 may include and/or be formed as an outer platform 200A positioned adjacent and/or coupling stator vanes 40 to casing 26 of turbine 28, and an inner platform 200B positioned opposite the outer platform 200A. Stator vanes 40 of turbine 28 may also include an airfoil 42 positioned between outer platform 200A and inner platform 200B. Outer platform 200A and inner platform 200B of stator vanes 40 may define a flow path (FP) for the combustion gases 26 flowing over stator vanes 40.

Stator vane 40 may be coupled to casing 36 via support 202. Support 202 may extend radially inward from casing 36 of turbine 28, and may be configured to be coupled to and/or receive HGP component formed as outer platform 200A of stator vanes 40 to couple, position, and/or secure stator vanes 40 to and/or within casing 36. In the non-limiting example, support 202 may be coupled and/or fixed to casing 36 of turbine 28. More specifically, support 202 may be circumferentially disposed around casing 36, and may be positioned axially adjacent turbine blades 38. In another non-limiting example (not shown), support 202 may be formed integral with casing 36 for coupling, positioning, and/or securing stator vanes 40 to and/or within casing 36. In another non-limiting example (not shown), support 202 may be coupled and/or affixed directly to a support for a HGP component associated with turbine blade 38, as discussed herein.

Each turbine blade 38 of turbine 28 may include an airfoil 46 extending radially from rotor 30 and positioned within the flow path (FP) of combustion gases 26 flowing through turbine 28. Each airfoil 46 may include a tip portion 48 positioned radially opposite rotor 30. Turbine blades 38 and stator vanes 40 may also be positioned axially adjacent to one another within casing 36. In the non-limiting example shown in FIG. 2, stator vanes 40 may be positioned axially adjacent and downstream of turbine blades 38. Not all turbine blades 38, stator vanes 40 and/or all of rotor 30 of turbine 28 are shown for clarity. Additionally, although only a portion of a single stage of turbine blades 38 and stator vanes 40 of turbine 28 are shown in FIG. 2, turbine 28 may include a plurality of stages of turbine blades and stator vanes, positioned axially throughout casing 36 of turbine 28.

Turbine 28 of gas turbine system 10 (see, FIG. 1) may also include a plurality of hot gas path (HGP) components 100. In a non-limiting example shown in FIG. 2, HGP component 100 may be turbine shrouds included within turbine 28. In this non-limiting examples discussed herein with respect to FIGS. 2-13, HGP component 100 and turbine shroud may be used interchangeably. Turbine 28 may include a stage of HGP components 100 (one shown). HGP components 100 may correspond with the stage of turbine blades 38 and/or the stage of stator vanes 40. That is, and as discussed herein, the stage of HGP components 100 may be positioned within turbine 28 adjacent the stage of turbine blades 38 and/or the stage of stator vanes 40 to interact with and provide a seal in the flow path (FP) of combustion gases 26 flowing through turbine 28. In the non-limiting example shown in FIG. 2, the stage of HGP components 100 may be positioned radially adjacent and/or may substantially surround or encircle the stage of turbine blades 38. HGP components 100 may be positioned radially adjacent tip portion 48 of airfoil 46 for turbine blade 38. Additionally, HGP components 100 may also be positioned axially adjacent and/or upstream of stator vanes 40 of turbine 28.

Similar to stator vanes 40, the stage of HGP components 100 may include a plurality of HGP components 100 that may be coupled to and positioned circumferentially about casing 36 of turbine 28. In the non-limiting example shown in FIG. 2, HGP components 100 may be coupled to casing 36 via support 102 extending radially inward from casing 36 of turbine 28. Support 102 may be configured to be coupled to and/or receive fasteners or hooks (see, FIG. 4) of HGP components 100 to couple, position, and/or secure HGP components 100 to casing 36 of turbine 28. In the non-limiting example, support 102 may be coupled and/or fixed to casing 36 of turbine 28. More specifically, support 102 may be circumferentially disposed around casing 36, and may be positioned radially adjacent turbine blades 38. In another non-limiting example (not shown), support 102 may be formed integral with casing 36 for coupling, positioning, and/or securing HGP components 100 to casing 36. Similar to turbine blades 38 and/or stator vanes 40, although only a portion of the stage of HGP components 100 of turbine 28 is shown in FIG. 2, turbine 28 may include a plurality of stages of HGP components 100, positioned axially throughout casing 36 of turbine 28 and coupled to casing 26 using support 102.

Figure 3:
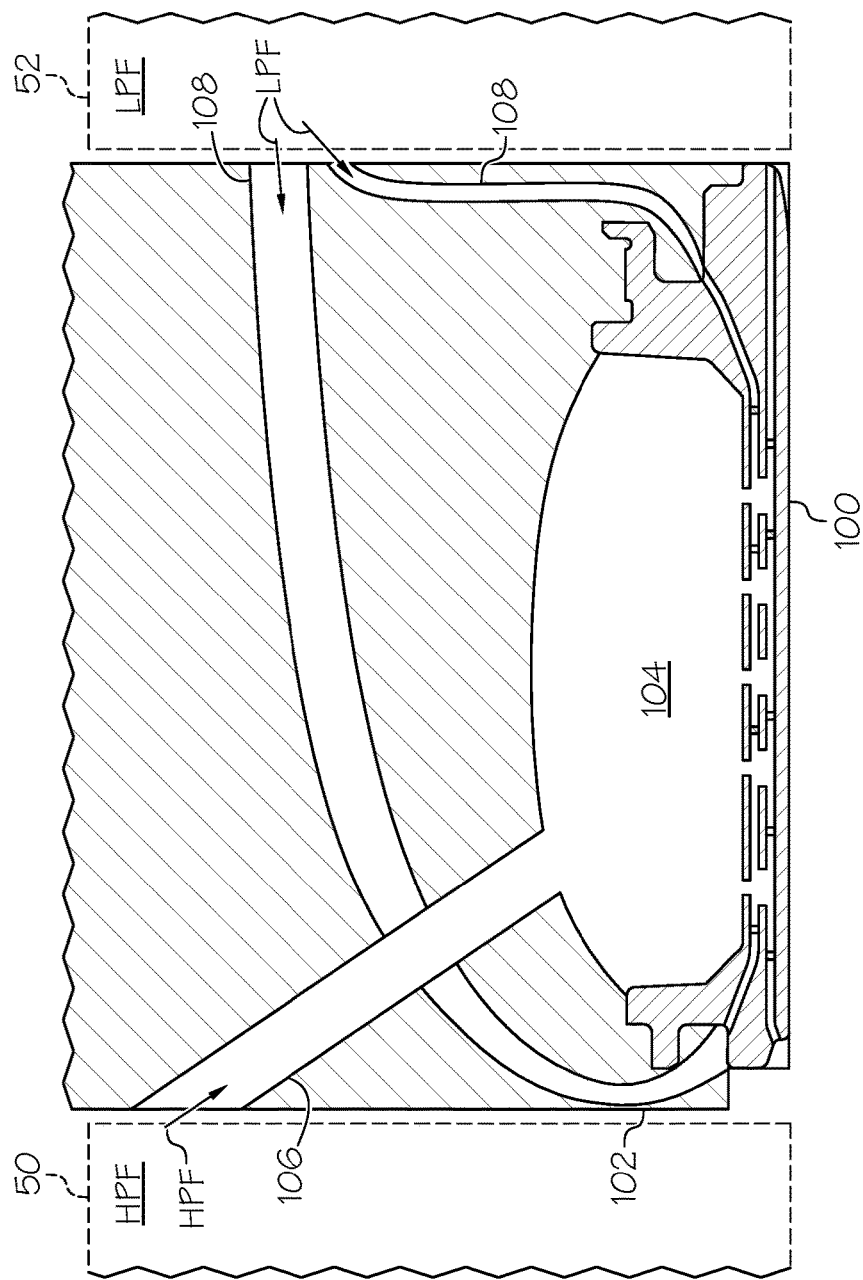
FIG. 3 shows an enlarged side view of a portion of the gas turbine system of FIG. 2, according to embodiments of the disclosure.

Turning to FIG. 3, an enlarged portion of turbine 28 including HGP component 100 and support 102 is shown. As discussed herein, HGP component 100 and support 102 of turbine 28 may include various additional features that permit use of low pressure fluid (LPF), along with the high pressure fluid (HPF), to cool HGP component 100 during operation of turbine 28. The inclusion of these features in HGP components 100 and/or support 102 may reduce the amount of high pressure fluid required to cool HGP component 100, which in turn reduces fuel consumption and/or heat rate within turbine system 10 (see, FIG. 1).

As shown in FIGS. 2 and 3, support 102 may include a high pressure fluid chamber 104. High pressure fluid chamber 104 may be formed within support 102, radially adjacent to, and/or radially outward from HGP component 100. Additionally, and as discussed herein, high pressure fluid chamber 104 may be fluidly coupled and/or in fluid communication with features (e.g., nozzles) of HGP component 100. High pressure fluid chamber 104 may be formed in support 102 to receive high pressure fluid (HPF) flowing through and/or within turbine 28 that may be subsequently provided to HGP component 100 during operation of gas turbine system 10 (see, FIG. 1). In the non-limiting example shown in FIGS. 2 and 3, high pressure fluid (HPF) may be flowing within turbine 28 and/or turbine casing 36. Specifically, the HPF may be flowing in and/or through area 50 of turbine 28, substantially adjacent to and/or upstream of support 102. The HPF may be any suitable fluid (e.g., air) flowing within turbine 28 suitable to cool HGP component 100 during operation of turbine system 10 (see, FIG. 1). In a non-limiting example, the HPF may be fluid flowing from compressor discharge chamber (CDC) of turbine 28.

Support 102 may also include at least one high pressure supply conduit 106 formed therein. High pressure supply conduit 106 may be in fluid communication with and/or fluidly coupled to high pressure fluid chamber 104. That is, high pressure supply conduit 106 may be in fluid communication with area 50 containing the HPF, as well as high pressure fluid chamber 104. As a result, high pressure supply conduit 106 may receive the HPF flowing through area 50, and may provide the HPF to high pressure fluid chamber 104 of support 102. Once received from high pressure supply conduit 106, high pressure fluid chamber 104 may provide the HPF to HGP component 100, as discussed herein. Although shown in the non-limiting example as only including a single high pressure supply conduit 106, it is understood that support 102 may include a plurality of high pressure supply conduits 106 (e.g., FIG. 7) for providing HPF to HGP component 100.

As shown in FIGS. 2 and 3, support 102 may also include at least one low pressure supply conduit 108. Low pressure supply conduit(s) 108 may be in fluid communication with and/or fluidly coupled to an area 52 within of turbine casing 36 that may contain a low pressure fluid (LPF). The LPF may be flowing substantially adjacent to and/or downstream of support 102 for turbine 28. As such, area 52 containing the LPF may be formed between support 102 and outer platform 200A of stator vane 40. Additionally as shown in FIGS. 2 and 3, and discussed herein, low pressure supply conduit(s) 108 may be fluidly coupled to and/or in fluid communication with HGP component 100 to provide the LPF from area 52 to HGP component 100 during operation of turbine system 10 (see, FIG. 1). The LPF may be any suitable fluid (e.g., air) flowing within turbine 28 to cool HGP component 100, as discussed herein. In a non-limiting example, the LPF may be compressor extraction fluid of turbine 28 flowing between turbine blades 38 and stator vanes 40.

In the non-limiting example shown in FIGS. 2 and 3, support 102 may include and/or be formed as a single, continuous, and/or non-disjointed component or part. In the non-limiting example, and because support 102 is formed from a single, continuous, and/or non-disjointed component or part, support 102 may not require the building, joining, coupling, and/or assembling of various parts to completely form support 102, and/or may not require building, joining, coupling, and/or assembling of various parts before support 102 can be installed and/or implemented within turbine system 10 (see, FIG. 1). Rather, once single, continuous, and/or non-disjointed support 102 is built to include the various features therein (e.g., high pressure supply conduit 106, low pressure supply conduit 108), support 102 may be immediately installed within turbine system 10 and/or turbine casing 36.

In the non-limiting example, support 102, and the various features formed therein e.g., high pressure fluid chamber 104, high pressure supply conduit 106, low pressure supply conduit 108), may be formed using any suitable additive manufacturing process(es) and/or method. For example, support 102 may be formed by direct metal laser melting (DMLM) (also referred to as selective laser melting (SLM)), direct metal laser sintering (DMLS), electronic beam melting (EBM), stereolithography (SLA), binder jetting, or any other suitable additive manufacturing process(es). Additionally, support 102 may be formed from any material that may be utilized by additive manufacturing process(es), and/or capable of withstanding the operational characteristics (e.g., exposure temperature, exposure pressure, and the like) experienced by support 102 within gas turbine system 10 during operation.

In another non-limiting example, support 102 may be formed as multiple and/or distinct portions or components. For example, support 102 may be formed from two distinct components or parts including at least a portion of the various features of support 102. The two components forming support 102 may be joined, coupled, and/or affixed to one another before support 102 is installed in turbine 28 within gas turbine system 10. Each component forming support 102, and the various features of support 102, may be formed using any suitable manufacturing process(es) and/or method. For example, support 102 including the two, distinct components may be formed by milling, turning, cutting, casting, molding, drilling, and the like. In a further non-limiting example, support 102 may be formed from a single piece of material by performing suitable material removal or subtraction processes including, but not limited to, milling, turning, cutting, drilling, and the like.

Figure 4:
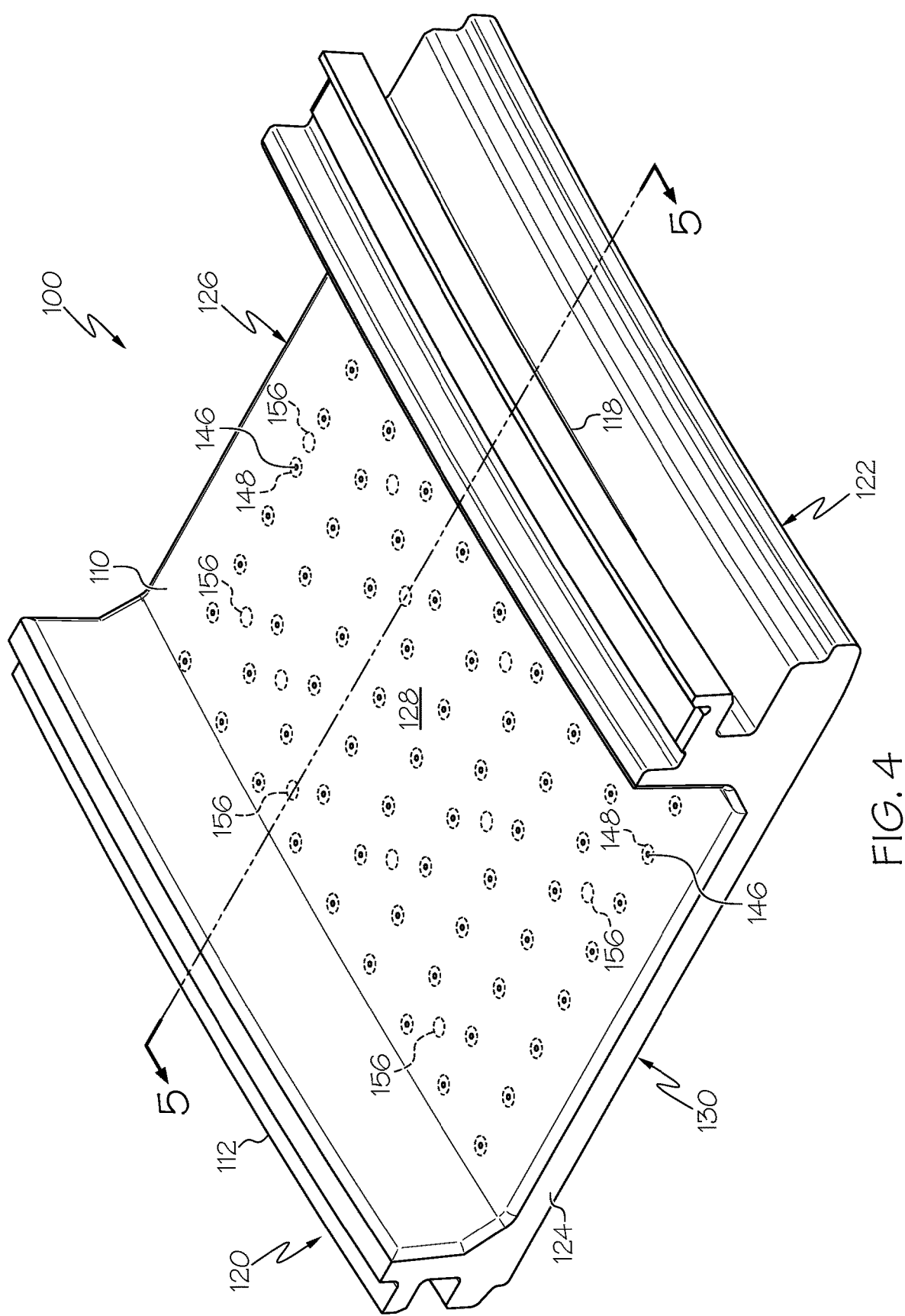
FIG. 4 shows an isometric view of the hot gas path component of FIGS. 2 and 3, according to embodiments of the disclosure.
Figure 5:
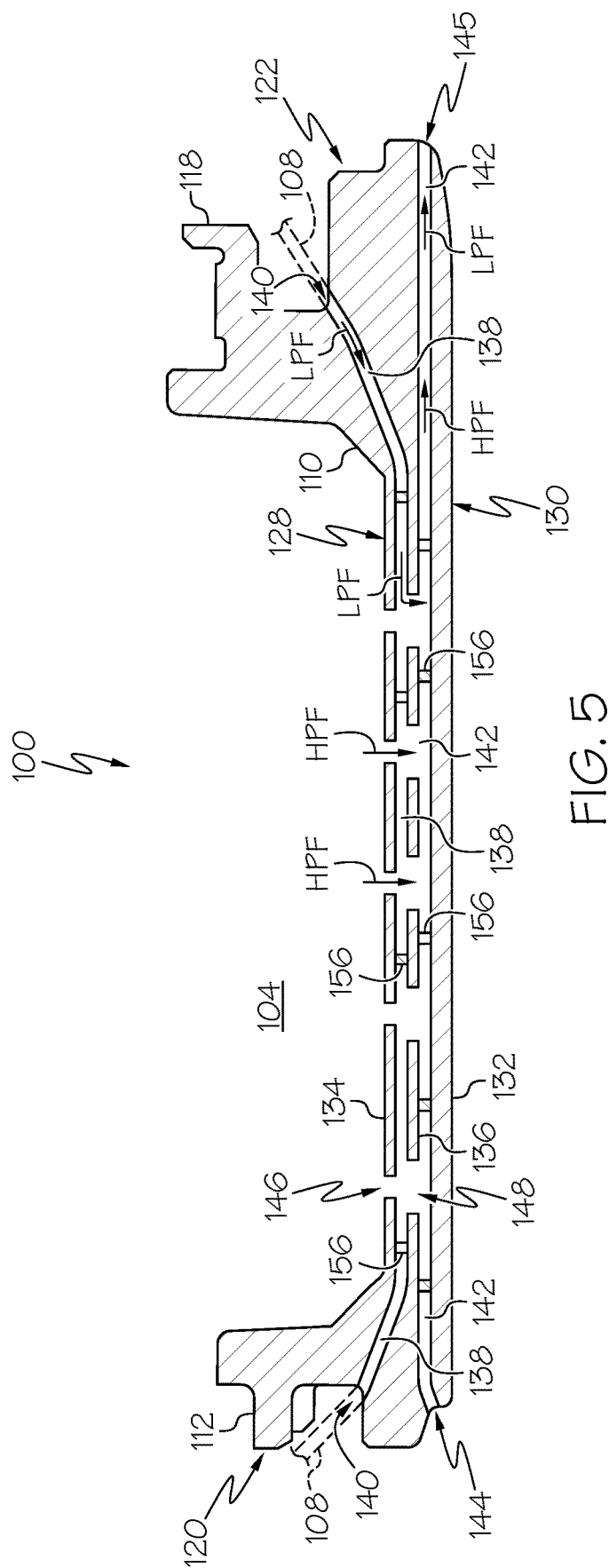
FIG. 5 shows a cross-sectional side view of the hot gas path component taken along line CS-CS in FIG. 4, according to embodiments of the disclosure.
Figure 6:
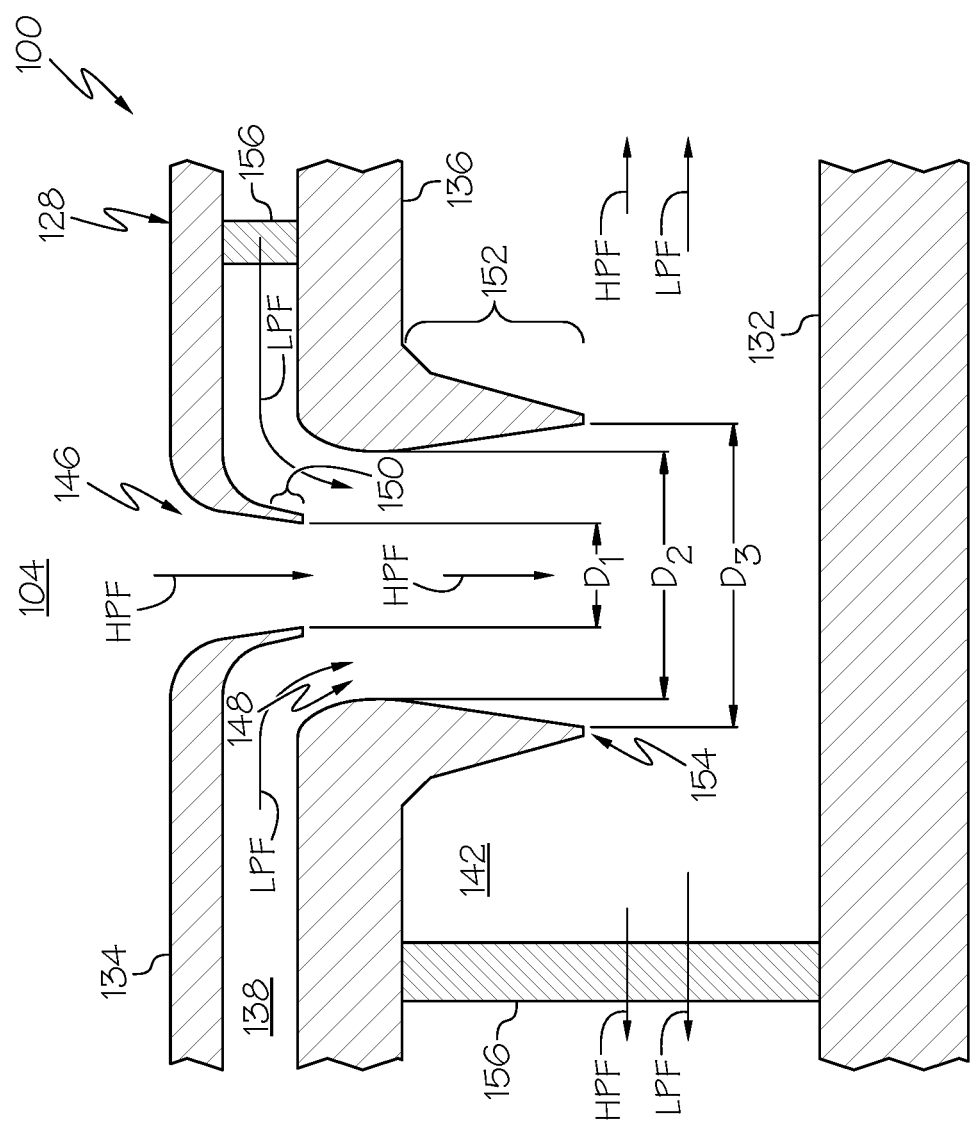
FIG. 6 shows an enlarged cross-sectional side view of the hot gas path component of FIG. 5, according to embodiments of the disclosure.

FIGS. 4-6 show various views of HGP component 100 of turbine 28 for gas turbine system 10 of FIG. 1. Specifically, FIG. 4 shows an isometric view of HGP component 100, FIG. 5 shows a cross-sectional side view of HGP component 100 taken along line CS-CS in FIG. 4, and FIG. 6 shows an enlarged cross-sectional side view of a portion of HGP component 100 in FIG. 5.

HGP component 100 may include a body 110. In the non-limiting example shown in FIGS. 4 and 5, HGP component 100 may include and/or be formed as a unitary body 110 such that HGP component 100 is a single, continuous, and/or non-disjointed component or part. In the non-limiting example shown in FIGS. 4 and 5, because HGP component 100 includes a unitary body, HGP component 100 may not require the building, joining, coupling, and/or assembling of various parts to completely form HGP component 100, and/or may not require building, joining, coupling, and/or assembling of various parts before HGP component 100 can be installed and/or implemented within turbine system 10 (see, FIG. 1). Rather, once single, continuous, and/or non-disjointed unitary body 110 for HGP component 100 is built, as discussed herein, HGP component 100 may be immediately installed within turbine system 10.

In the non-limiting example, unitary body 110 of HGP component 100, and the various components and/or features of HGP component 100, may be formed using any suitable additive manufacturing process(es) and/or method. For example, HGP component 100 including unitary body 110 may be formed by direct metal laser melting (DMLM) (also referred to as selective laser melting (SLM)), direct metal laser sintering (DMLS), electronic beam melting (EBM), stereolithography (SLA), binder jetting, or any other suitable additive manufacturing process(es). Additionally, unitary body 110 of HGP component 100 may be formed from any material that may be utilized by additive manufacturing process(es) to form HGP component 100, and/or capable of withstanding the operational characteristics (e.g., exposure temperature, exposure pressure, and the like) experienced by HGP component 100 within gas turbine system 10 during operation.

Figure 8:
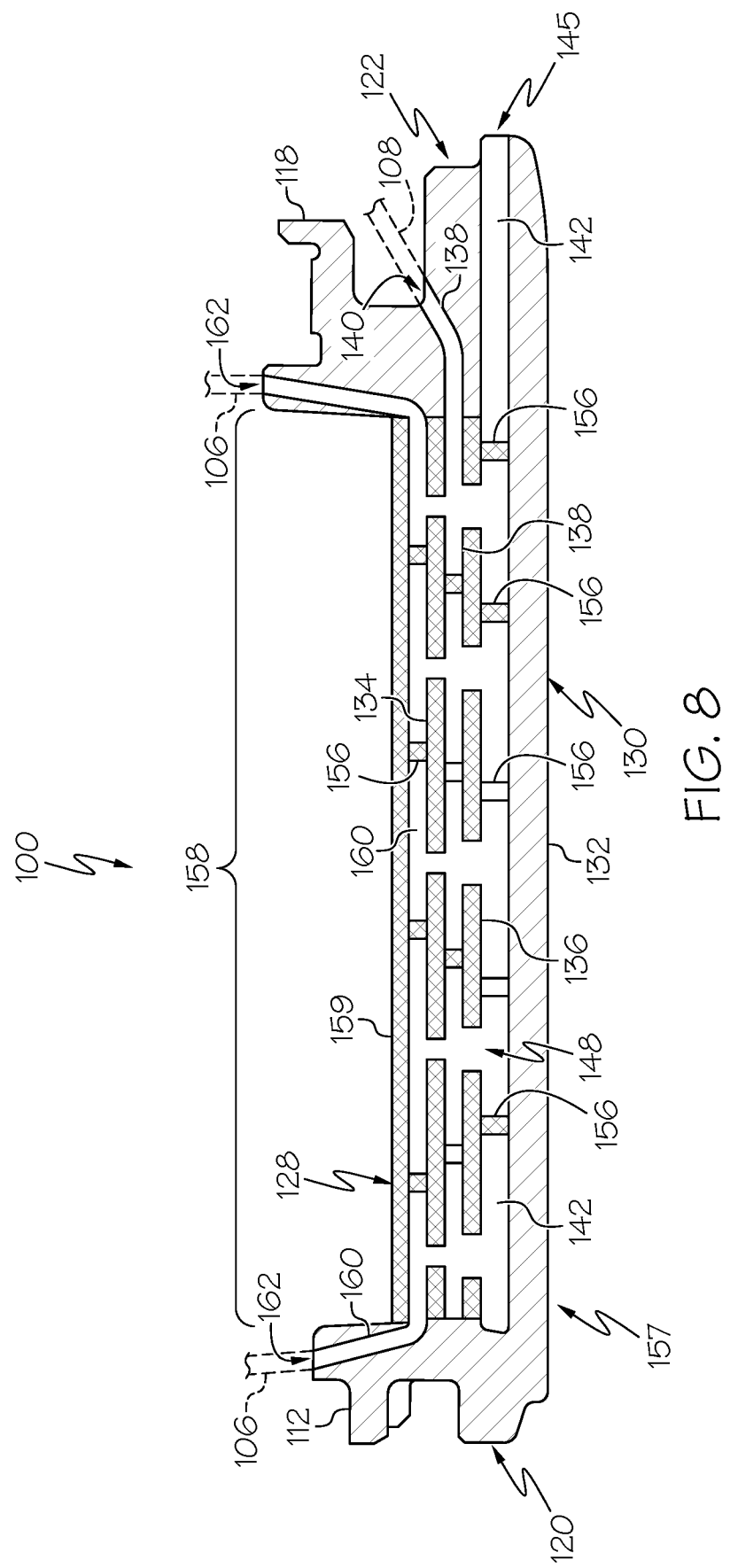
FIG. 8 shows a cross-sectional side view of the hot gas path component shown in FIG. 7, according to embodiments of the disclosure.

In another non-limiting example, body 110 of HGP component 100 may be formed as multiple and/or distinct portions or components (see, FIGS. 7 and 8). For example, and as discussed herein, body 110 of HGP component 100 may be formed from a first part that may include hooks 112, 118 and an inner surface, and a second part that may include the outer surface (and a portion of internal features) of HGP component 100. The two components forming body 110 of HGP component 100 may be joined, coupled, and/or affixed to one another to form HGP component 100 before being installed in turbine 28 within gas turbine system 10. Each component forming body 110, and the various components and/or features of HGP component 100, may be formed using any suitable manufacturing process(es) and/or method. For example, HGP component 100 including body 110 including the two, distinct components may be formed by milling, turning, cutting, casting, molding, drilling, and the like.

HGP component 100 may also include various ends, sides, and/or surfaces. For example, and as shown in FIGS. 4 and 5, body 110 of HGP component 100 may include a forward end 120 and an aft end 122 positioned opposite forward end 120. Forward end 120 may be positioned upstream of aft end 122, such that combustion gases 26 flowing through the flow path (FP) defined within turbine 28 may flow adjacent forward end 120 before flowing by adjacent aft end 122 of body 110 of HGP component 100. As shown in FIGS. 3 and 4, forward end 120 may include first hook 112 configured to be coupled to and/or engage support 102 of casing 36 for turbine 28 to couple, position, and/or secure HGP components 100 within casing 36 (see, FIG. 2). Additionally, aft end 122 may include second hook 118 positioned and/or formed on body 110 opposite first hook 112. Similar to first hook 112, second hook 118 may be configured to be coupled to and/or engage support 102 of casing 36 for turbine 28 to couple, position, and/or secure HGP components 100 within casing 36 (see, FIG. 2).

Additionally, body 110 of HGP component 100 may also include a first side 124, and a second side 126 positioned opposite first side 124. As shown in FIG. 4, first side 124 and second side 126 may extend and/or be formed between forward end 120 and aft end 122. First side 124 and second side 126 of body 110 may be substantially closed and/or may include solid end walls or caps. As such, and as discussed herein, the solid end walls of first side 124 and second side 126 may substantially prevent fluid within turbine 28 (e.g., combustion gases 26, cooling fluids) from entering HGP component 100, and/or cooling fluid from exiting internal portions (e.g., passages, plenums) formed within HGP component 100 via first side 124 and/or second side 126.

As shown in FIGS. 4 and 5 body 110 of HGP component 100 may also include an outer surface 128. In the non-limiting example, outer surface 128 may face high pressure fluid chamber 104 formed between body 110 of HGP component 100 and support 102 (see, FIG. 2). More specifically, outer surface 128 may be positioned, formed, face, and/or directly exposed in high pressure fluid chamber 104 formed within support 102. As discussed herein, high pressure fluid chamber 104 of support 102 may receive and/or provide HPF to HGP component 100 during operation of turbine 28. In addition to facing high pressure fluid chamber 104, outer surface 128 of body 110 for HGP component 100 may also be formed, extend, and/or positioned between forward end 120 and aft end 122, as well as first side 124 and second side 126, respectively.

Body 110 of HGP component 100 may also include inner surface 130 formed opposite outer surface 128. That is, and as shown in the non-limiting example in FIGS. 4 and 5, inner surface 130 of body 110 of HGP component 100 may be formed radially opposite and/or radially inward from outer surface 128. Briefly returning to FIG. 2, and with continued reference to FIGS. 4 and 5, inner surface 130 may face the hot gas flow path (FP) of combustion gases 26 flowing through turbine 28 (see, FIG. 2). More specifically, inner surface 130 may be positioned, formed, face, and/or directly exposed to the hot gas flow path (FP) of combustion gases 26 flowing through turbine casing 36 of turbine 28 for gas turbine system 10. Additionally as shown in FIG. 2, inner surface 130 of body 110 for HGP component 100 may be positioned radially adjacent tip portion 48 of airfoil 46. In addition to facing the hot gas flow path (FP) of combustion gases 26, and similar to outer surface 128, inner surface 130 of body 110 for HGP component 100 may also be formed and/or positioned between forward end 120 and aft end 122, and first side 124 and second side 126, respectively.

Turning to FIGS. 5 and 6, and with continued reference to FIGS. 2-4, additional features of HGP component 100 are now discussed. HGP component 100 may include an inner portion 132. As shown in FIG. 5, inner portion 132 may be formed as an integral portion of unitary body 110 for HGP component 100. Additionally, inner portion 132 may include inner surface 130, and/or inner surface 130 may be formed on inner portion 132 of body 110 for HGP component 100. Inner portion 132 of body 110 for HGP component 100 may be formed, positioned, and/or extend between forward end 120 and aft end 122, and first side 124 and second side 126, respectively. Additionally, inner portion 132 may be formed integral with the solid side walls formed on first side 124 and second side 126 of body 110 (see, FIG. 4). Briefly returning to FIGS. 2 and 3, inner portion 132 of HGP component 100 may also be positioned adjacent hot gas flow path (FP) for turbine 28 of turbine system 10, and/or may be radially adjacent and/or radially outward from tip portion 48 of airfoil 46. As discussed herein, inner portion 132 of HGP component 100 may at least partially form and/or define at least one cooling channel within HGP component 100.

HGP component 100 may include an outer portion 134 formed radially opposite inner portion 132. Similar to inner portion 132, as shown in FIG. 5, outer portion 134 may be formed as an integral portion of unitary body 110 for HGP component 100. Outer portion 134 may include outer surface 128, and/or outer surface 128 may be formed on outer portion 134 of body 110 for HGP component 100. Outer portion 134 of body 110 for HGP component 100 may be formed, positioned, and/or extend between forward end 120 and aft end 122, and first side 124 and second side 126, respectively. Additionally, and also similar to inner portion 132, outer portion 134 may be formed integral with the solid side walls formed on first side 124 and second side 126 of body 110. As shown in FIGS. 3 and 5, outer portion 134 may be formed (radially) adjacent high pressure fluid chamber 104 of support 102. Outer portion 134 of HGP component 100 may at least partially form and/or define low pressure fluid channel within HGP component 100, as discussed herein.

As shown in the non-limiting example of FIG. 5, HGP component 100 may also include an intermediate portion 136. Intermediate portion 136 may be formed (radially) between inner portion 132 and outer portion 134 of unitary body 110 of HGP component 100. Similar to inner portion 132 and outer portion 134, and as shown in FIG. 5, intermediate portion 136 of HGP component 100 may be formed as an integral portion of body 110 for HGP component 100. Intermediate portion 136 of body 110 for HGP component 100 may be formed, positioned, and/or extend between forward end 120 and aft end 122, and first side 124 and second side 126, respectively, and may be formed integral with the solid side walls formed on first side 124 and second side 126 of body 110 (see, FIG. 4).

Inner portion 132, outer portion 134, and/or intermediate portion 136 may at least partially form and/or define channels within HGP component 100. For example, intermediate portion 136 and outer portion 134 may define and/or form a low pressure fluid channel 138 within HGP component 100. More specifically, low pressure fluid channel 138 may be formed between intermediate portion 136 and outer portion 134 of unitary body 110 for HGP component 100. Low pressure fluid channel 138 may extend substantially between forward end 120 and aft end 122, and first side 124 and second side 126, respectively, of unitary body 110. As discussed herein, low pressure fluid channel 138 may receive LPF via an opening(s) 140 formed through HGP component 100 and in fluid communication with low pressure supply conduit(s) 108 (portion shown in phantom) of support 102.

In the non-limiting example shown in FIG. 5, intermediate portion 136 and inner portion 132 may also define and/or form a cooling channel 142 within HGP component 100. That is, cooling channel 142 may be formed between intermediate portion 136 and inner portion 132 of unitary body 110 for HGP component 100. Cooling channel 142 may extend substantially between forward end 120 and aft end 122, and first side 124 and second side 126, respectively, of body 110. As discussed herein, cooling channel 142 may receive the HPF and low pressure fluid (LPF) to cool HGP component 100 during operation of gas turbine system 10 (see, FIG. 1), and may subsequently expel or exhaust the HPF and LPF from HGP component 10 via exhaust holes 144.

In order to provide the HPF and the LPF within the various portions (e.g., channels 138, 142) of HGP component 100 to cool the component, HGP component 100 and/or body 110 may also include a plurality and/or array of openings formed therein. For example, outer portion 134 and intermediate portion 136 of HGP component 100 may each include a plurality and/or array of openings, nozzles, and/or venturi formed therein and/or extending therethrough. In the non-limiting example shown in FIGS. 4-6, outer portion 134 may include a plurality of high pressure openings or nozzles 146 (hereafter, "nozzles 146") formed therein or extending therethrough. Each of the plurality of nozzles 146 may be formed through outer surface 128 and outer portion 134 of unitary body 110 for HGP component 100. The plurality of nozzles 146 formed through outer portion 134 may be in fluid communication with and/or fluidly coupled to high pressure fluid chamber 104 of support 102. As a result of being fluidly coupled to high pressure fluid chamber 104, each of the plurality of nozzles 146 may also be in fluid communication with the HPF flowing through turbine 28 and/or high pressure supply conduit(s) 106 of support 102 (see, FIG. 3). Additionally, and as shown in FIG. 5, the plurality of nozzles 146 formed through outer portion 134 may fluidly couple high pressure fluid chamber 104 of support 102 and low pressure fluid channel 138 of HGP component 100. As discussed herein, each of the plurality of nozzles 146 formed through outer portion 134 may receive the HPF from the high pressure supply conduit 106 and/or high pressure fluid chamber 104 of support 102, and subsequently provide or flow the HPF to low pressure fluid channel 138 of HGP component 100.

Also shown in the non-limiting example of FIGS. 4-6, intermediate portion 136 may include a plurality of low pressure openings or venturi 148 (hereafter, "venturi 148") formed therein or extending therethrough. Each of the plurality of venturi 148 may be formed or extend through intermediate portion 136 of unitary body 110 for HGP component 100. The plurality of venturi 148 formed through intermediate portion 136 may be in fluid communication with and/or may fluidly couple low pressure fluid channel 138 and cooling channel 142 formed within unitary body 110 for HGP component 100. Additionally, and because venturi 148 are in fluid communication with low pressure fluid channel 138, venturi 148 of HGP component 100 may also be in fluid communication with the LPF flowing through low pressure fluid channel 138, and/or may be in fluid communication with low pressure supply conduit(s) 108 of support 102 providing the LPF to low pressure fluid channel 138. As discussed herein, each of the plurality of venturi 148 formed through intermediate portion 136 may receive the LPF from low pressure fluid channel 138, and subsequently provide or flow the LPF to cooling channel 142. Additionally, and as discussed herein, each of the plurality of venturi 148 may receive the high pressure fluid (HPF) flowing through low pressure fluid channel 138 via the plurality of nozzles 146, and subsequently provide or flow the HPF to cooling channel 142. As discussed herein, nozzles 146 of HGP component 100 may differ from venturi 148 of HGP component 100 based on the size, shape, and/or configuration (e.g., the inclusion of a diffuser).

Turning to FIG. 6, and with continued reference to FIG. 5, an enlarged cross-section view of HGP component 100 including a single nozzle 146 and a single venturi 148 is shown. In the non-limiting example shown in FIGS. 5 and 6, the plurality of nozzles 146 formed in outer portion 134 and the plurality of venturi 148 formed in intermediate portion 136 of HGP component 100 may be radially and/or concentrically aligned. That is, each of the plurality of nozzles 146 may be aligned and/or substantially concentric with a corresponding venturi 148. Additionally, and as shown in the non-limiting example FIG. 6, each of the plurality of nozzles 146 formed in outer portion 134 may include a section 150 that may extend into a corresponding venturi 148 formed in intermediate portion 136. Specifically, section 150 of may extend into and/or may be positioned partially within and/or surrounded by the radially and/or concentrically aligned, corresponding venturi 148 of HGP component 100. As discussed herein, section 150 of each nozzles 146 may extend into corresponding venturi 148 to direct HPF through venturi 148. Additionally, or alternatively, section 150 of each nozzles 146 may extend into corresponding venturi 148 to direct low pressure fluid (LPF) flowing through low pressure fluid channel 138 into venturi 148, and/or prevent the LPF from flowing radially outward through nozzles 146.

As shown in FIG. 6, each of the plurality of nozzles 146 may be sized differently and/or may include a distinct dimension than the plurality of venturi 148. That is, a dimension (e.g., diameter) of the plurality of nozzles 146 may be distinct from a dimension of the plurality of venturi 148. In the non-limiting example, each of the plurality of nozzles 146 formed in outer portion 134 may include a first diameter ($D_1$) at the throat or neck (e.g., narrowest part) of the nozzle opening or configuration. Additionally, each of the plurality of venturi 148 formed in intermediate portion 136 may include a second diameter ($D_2$) at the throat (e.g., narrowest part) of the venturi opening or configuration. As shown in the non-limiting example in FIG. 6, the second diameter ($D_2$) of each venturi 148 may be greater or larger than the first diameter ($D_1$) of nozzle 146. In non-limiting examples the second diameter of venturi 148 may be at least twice as large (e.g., 2:1 ratio or greater) than the first diameter ($D_1$) of nozzle 146. In other non-limiting examples, the second diameter of venturi 148 may be marginally larger (e.g., 10% larger) than the first diameter ($D_1$) of nozzle 146. The size or dimension of each of the first diameter ($D_1$) and the second diameter ($D_2$), as well as the difference between first diameter ($D_1$) and the second diameter ($D_2$) may improve the velocity and/or pressure of the HPF and LPF flowing through HGP component 100, as discussed herein.

It is understood that the size and/or number of nozzles 146 and venturi 148 formed within HGP component 100, as shown in FIGS. 5 and 6, is merely illustrative. As such, HGP component 100 may include larger or smaller nozzles 146 and venturi 148, and/or may include more or less nozzles 146 and venturi 148 formed therein. Additionally, although the nozzles 146 and venturi 148 are both shown to be substantially uniform in size and/or shape, it is understood that each of the plurality of nozzles 146 and venturi 148 formed in HGP component 100 may include distinct sizes and/or shapes. The size, shapes, and/or number of nozzles 146 and venturi 148 formed in HGP component 100 may depend at least in part on various parameters (e.g., exposure temperature, exposure pressure, position within turbine casing 36, HPF operational pressure/temperature, LPF operational pressure/temperature, and the like) of gas turbine system 10 during operation. Additionally, or alternatively, the size, shapes, and/or number of nozzles 146 and venturi 148 formed in HGP component 100 may be dependent, at least in part on the characteristics (e.g., inner portion 132 thickness, outer portion 134 thickness, volume of cooling channel 142, and so on) of HGP component 100.

Additionally as shown in FIG. 6, intermediate portion 136 of unitary body 110 for HGP component 100 may also include a plurality of diffusers 152. Each of the plurality of diffusers 152 may be formed integral with a corresponding venturi 148 formed through intermediate portion 136. That is, and as shown in FIG. 6, diffuser 152 may be formed integral with each venturi 148 and may be positioned radially adjacent the venturi 148, and more specifically the throat (e.g., narrowest part) of each venturi 148. Diffuser 152 may also be formed adjacent and/or extend radially toward inner portion 132 of body 110 of HGP component 100. In the non-limiting example, diffuser 152 may include a diverging shape, geometry, and/or configuration that gets larger or wider as diffuser 152 extends (radially) closer toward inner portion 132 of HGP component 100. In the non-limiting example, the largest dimension (e.g., diameter) of diffuser 152 may be formed at an end 154 radially adjacent inner portion 132. End 154 of diffuser 152 may include a third diameter ($D_3$), that may be larger or greater than first diameter ($D_1$) of nozzles 146 and second diameter ($D_2$) of venturi 148. In additional to the size or dimension of each of the first diameter ($D_1$) and the second diameter ($D_2$), the size of the third diameter ($D_3$) of each diffuser 152 of HGP component 100 may increase a static pressure of the HPF and LPF flowing through HGP component 100, as discussed herein.

Furthermore, although discussed herein as being substantially circular and/or including distinct diameters (e.g., first diameter ($D_1$), the second diameter ($D_2$), and so on), it is understood that nozzles 146, venturi 148, and/or diffusers 152 may be formed from distinct shapes or configurations. As such, the dimensions of each of nozzles 146, venturi 148, and diffusers 152 may not include a diameter. That is for example, nozzles 146, venturi 148, and/or diffusers 152 may be substantially square or polygonal. In these non-limiting examples, each of nozzles 146, venturi 148, and diffusers 152 may include unique and/or distinct areas (e.g., dimension). More specifically, the throat of nozzles 146 may include a first area ($A_1$), the throat of venturi 148 may include a second area ($A_2$) that may be larger than the first area ($A_1$) of nozzles 146, and diffusers 152 may include a third area ($A_3$) that is larger than both the first area ($A_1$) and the second area ($A_2$), respectively.

Additionally as shown in FIGS. 4-6, HGP component 100 may also include a plurality of support pins 156. Specifically, body 110 of HGP component 100 may include a plurality of support pins 156 positioned/extending between, and formed integral with inner portion 132 and intermediate portion 136, as well as intermediate portion 136 and outer portion 134. As shown in FIGS. 5 and 6, the plurality of support pins 156 extending between inner portion 132 and intermediate portion 136 may also be positioned within cooling channel 142, and the plurality of support pins 156 extending between intermediate portion 136 and outer portion 134 may be positioned within low pressure fluid channel 138. The plurality of support pins 156 may be positioned throughout body 110 for HGP component 100 to provide support, structure, and/or rigidity to inner portion 132, outer portion 134, and/or intermediate portion 136. The inclusion of the plurality of support pins 156 extending between and/or be formed integral with inner portion 132, outer portion 134, and/or intermediate portion 136 provides additional support, structure, and/or rigidity to the various portions of HGP component 100, and may substantially prevent vibration of the same during operation of gas turbine system 10. In addition to providing support, structure, and/or rigidity to inner portion 132, outer portion 134, and/or intermediate portion 136, the plurality of support pins 156 positioned within low pressure fluid channel 138 and/or cooling channel 142 may also aid in the heat transfer and/or cooling of HGP component 100 during operation of gas turbine system 10 (see, FIG. 1), as discussed herein. The plurality of support pins 156 may be formed integral with inner portion 132, outer portion 134, and/or intermediate portion 136 when forming unitary body 110 of HGP component 100 using any suitable additive manufacturing process(es) and/or method.

The size, shape, and/or number of support pins 156 positioned within HGP component 100, as shown in FIGS. 4-6, is merely illustrative. As such, HGP component 100 may include larger or smaller support pins 156, varying sized support pins 156, and/or may include more or less support pins 156 formed therein. The size, shapes, and/or number of support pins 156 formed in HGP component 100 may be dependent, at least in part on the operational characteristics (e.g., exposure temperature, exposure pressure, position within turbine casing 36, and the like) of gas turbine system 10 during operation. Additionally, or alternatively, the size, shapes, and/or number of support pins 156 formed in HGP component 100 may be dependent, at least in part on the characteristics (e.g., inner portion 132 thickness, outer portion 134 thickness, height of channels 138, 142, and so on) of HGP component 100.

With reference to FIGS. 3-6, an example flow path of HPF and LPF through HGP component 100 is described. Specifically in FIGS. 3, 5 and 6, the flow direction of the fluid may be represented by arrows and may be labeled as "HPF" and "LPF."

In the non-limiting example, HPF may flow from area 50, through high pressure supply conduit 106 (see, FIG. 3), and into high pressure fluid chamber 104 of support 102. From high pressure fluid chamber 104, the HPF may flow through the plurality of nozzles 146 formed through outer portion 134. In the non-limiting example where nozzles 146 are radially aligned and/or concentric with venturi 148, the HPF may flow directly into and/or through the venturi 148 formed through intermediate portion 136. The HPF may mix with and substantially energize or increase the velocity of the LPF also flowing through venturi 148. The HPF may flow through the venturi 148, may be diffused by diffuser 152 of intermediate portion 136, and may flow to cooling channel 142 of HGP component 100. Once inside cooling channel 142, the mixture of HPF and LPF may substantially cool inner portion 132 of HGP component 100 and may flow through cooling channel 142 toward forward end 120 or aft end 122 before being exhausted from HGP component via exhaust holes 144 of cooling channel 142.

Simultaneous to and/or independently of the HPF flowing through HGP component 100, LPF may be provided to and flow through HGP component 100 as well. LPF may flow from area 52, through low pressure supply conduit(s) 108 of support 102 (see, FIG. 3). In the non-limiting example, low pressure supply conduit 108 may be in direct fluid communication with opening 140 of low pressure fluid channel 138 formed through aft end 122 of HGP component 100. Additionally, and as shown in phantom, a distinct low pressure supply conduit 108 may be in direct fluid communication with a distinct opening 140 of low pressure fluid channel 138 formed through forward end 120 of HGP component 100. As such, LPF may be provided on opposite sides or ends of low pressure fluid channel 138. Once provided to low pressure fluid channel 138, the LPF may flow through the plurality of venturi 148 formed through intermediate portion 136. In the non-limiting example where section 150 (see, FIG. 6) of nozzles 146 extends into venturi 148, nozzles 146 may direct the LPF through venturi 148. Additionally where nozzles 146 are radially aligned and/or concentric with venturi 148 the LPF may flow directly into venturi 148 and may mix with the HPF and substantially be charge or experience an increase in velocity when flowing through venturi 148. Similar to the HPF the LPF may flow through the venturi 148, may be diffused by diffuser 152 of intermediate portion 136, and may flow to cooling channel 142 of HGP component 100. Once inside cooling channel 142, the LPF, along with the HPF, may substantially cool inner portion 132 of HGP component 100 and may flow through cooling channel 142 toward forward end 120 or aft end 122 before being exhausted from HGP component via exhaust holes 144 and 145 of cooling channel 142 (see, FIG. 5).

FIGS. 7 and 8 show various views of another non-limiting example of turbine 28 including HGP component 100 and support 102. Specifically, FIG. 7 shows an enlarged side view of a non-limiting example of a portion of turbine 28 of gas turbine system 10 (see, FIG. 1) including HGP component 100 coupled to support 102, and FIG. 8 shows a cross-sectional side view of another non-limiting example of HGP component 100 shown in FIG. 7. It is understood that similarly numbered and/or named components may function in a substantially similar fashion. Redundant explanation of these components has been omitted for clarity.

As shown in FIG. 7, and with comparison to the non-limiting example discussed herein with respect to FIG. 3, support 102 may not include high pressure fluid chamber 104 (see, FIG. 3). Rather support 102 may be formed as a substantially solid and/or continuous component or part that may abut or contact outer surface 128 of HGP component 100, and may include a plurality of supply conduits formed therein. In the non-limiting example shown in FIG. 7, support 102 may include a plurality of high pressure supply conduits 106, and a single low pressure supply conduit 108 formed therein. The plurality of high pressure supply conduits 106 may extend through support 102, e.g., to forward end 120 or aft end 122 of HGP component 100. Additionally, each of the plurality of high pressure supply conduits 106 may be in direct fluid communication and/or fluidly coupled directly to HGP component 100. That is, each of the plurality of high pressure supply conduit 106 of support 102 may be in fluid communication and/or fluidly coupled to area 50 and a channel (e.g., high pressure fluid channel) (see, FIG. 8) of HGP component 100. As discussed herein, high pressure supply conduits 106 may provide the high pressure fluid (HPF) from area 50 to HGP component 100 during operation of gas turbine system 10 (see, FIG. 1).

Turning to FIG. 8, and with continued reference to FIG. 7, HGP component 100 may include additional features and/or components when utilized in turbine 28. For example, and as discussed herein, HGP component 100 may not be formed from a unitary body 110. Rather, HGP component 100 may be formed from a first part 157, and a distinct, second part 158. More specifically, HGP component 100 may be formed from and/or include first part 157 and second part 158 that may be joined, coupled, and/or affixed to first part 157. As shown in FIG. 8, first part 157 of HGP component 100 may include hooks 112, 118, inner surface 130 and inner portion 132 of HGP component 100. Additionally in the non-limiting example, first part 157 of HGP component 100 may include a portion of low pressure fluid channel(s) 138 including opening(s) 140 and a portion of a high pressure fluid channel(s) 160 including opening(s) 162, as discussed herein.

Second part 158 may include distinct features and/or portions of HGP component 100 than first part 157. For example, second part 158 may include outer portion 134, intermediate portion 136, and a top plate 159 including outer surface 128 of HGP component 100, as discussed herein. Additionally in the non-limiting example, second part 158 may also include nozzles 146 formed through outer portion 134, venturi 148 formed through intermediate portion 136, and a plurality of support pins 156 extending between and/or from outer portion 134, intermediate portion 136, and top plate 159, respectively. As shown in FIG. 8, second part 158 may also include a portion of low pressure fluid channel(s) 138 formed between outer portion 134 and intermediate portion 136, as well as a portion of high pressure fluid channel(s) 160 formed between outer portion 134 and top plate 159. Cooling channel 142 may be formed between first part 157 and second part 158, and more specifically, intermediate portion 136 of second part 158 and inner portion 132 of first part 157.

In the non-limiting example shown in FIG. 8, first part 157 and second part 158 may be formed from distinct materials. For example, first part 157 including hooks 112, 118 and inner portion 132 may be formed from a first metal or alloy having a first set of material properties and/or characteristics (e.g., melting point, heat transfer characteristics, hardness, ductility, and the like), while second part 158 may be formed from a second metal or allow having a second set of material properties and/or characteristics. Alternatively, first part 157 and second part 158 may be formed from identical materials. Each of first part 157 and second part 158 may each be formed individually and/or separately using any suitable manufacturing process including, but not limited to milling, turning, cutting, casting, molding, drilling, and the like. Additionally, first part 157 and second part 158 may be joined, coupled, and/or affixed to one another to form HGP component 100 using any suitable joining process or technique including, but not limited to, welding, fastening, melting, sintering, brazing, and the like.

In the non-limiting example shown in FIG. 8, HGP component 100 may also include top plate 159 formed radially outward, radially adjacent, and/or radially above outer portion 134 of second part 158. Additionally as shown in FIGS. 7 and 8, top plate 159 may be positioned radially inward from and/or may substantially contact or abut a portion of support 102. Top plate 159 may be formed from a substantially solid or continuous (e.g., no openings or venturi) component that may be formed, extend, and/or positioned substantially between forward end 120 and aft end 122, as well as first side 124 and second side 126, respectively. In the non-limiting example discussed herein, top plate 159 may be part of or formed in second part 158 forming HGP component 100. In other non-limiting examples (not shown), top plate 159 may be separate component or part of HGP component 100 that may be joined, coupled, and/or affixed to first part 157 and/or second part 158 to form HGP component 100.

Additionally as shown in FIG. 8, HGP component 100 may also include high pressure fluid channel 160. High pressure fluid channel 160 may be formed between outer portion 134 and top plate 159. That is, top plate 159 and outer portion 134 for HGP component 100 may define and/or form high pressure fluid channel 160 within HGP component 100. High pressure fluid channel 160 may extend substantially between forward end 120 and aft end 122, and first side 124 and second side 126, respectively, of HGP component 100. High pressure fluid channel 160 may include openings 162 extending through first part 157 of HGP component 100 and/or formed adjacent forward end 120 or aft end 122 of HGP component 100. Openings 162 may be fluidly coupled to a respective high pressure supply conduit 106 (portion shown in phantom) to receive HPF from high pressure supply conduits 106 of support 102 and subsequently supply the HPF to high pressure fluid channel 160. High pressure fluid channel 160 may supply or provide the HPF to the plurality of nozzles 146 formed through outer portion 134. As similarly discussed herein, the HPF may flow through the nozzles 146 to mix with and substantially energize or increase the velocity of the LPF as it flows through venturi 148. The HPF may be provided to cooling channel 142 of HGP component 100 before being exhausted from HGP component 100 via the array of openings 145.

Figure 9:
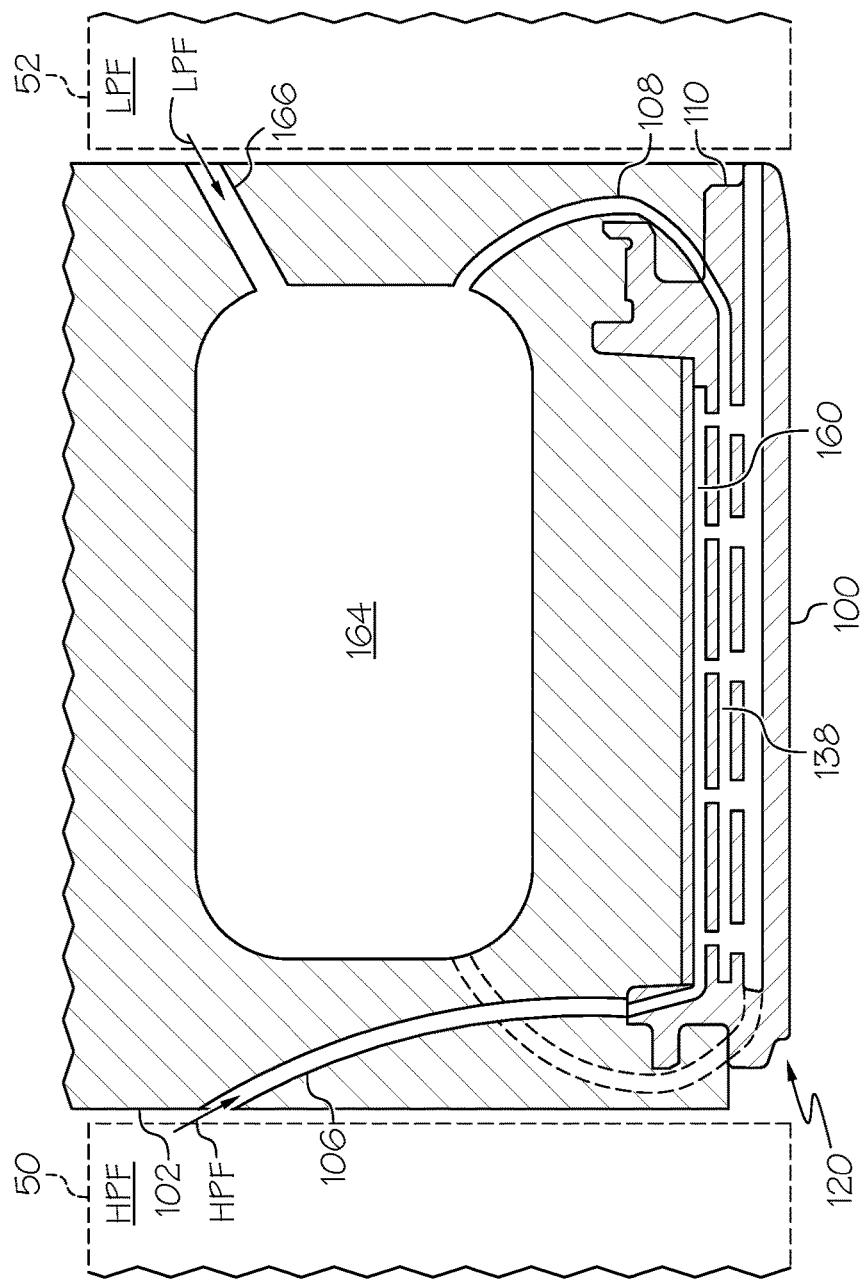
FIG. 9 shows an enlarged side view of a portion of the gas turbine system of FIG. 2, according to further embodiments of the disclosure.

FIG. 9 shows another non-limiting example of an enlarged side view of a portion of turbine 28 of gas turbine system 10 (see, FIG. 1) including HGP component 100 coupled to support 102. In the non-limiting example, HGP component 100 may be formed as unitary body 110, as similarly discussed herein with respect to FIGS. 3-5. Additionally, in the non-limiting example, support 102 may only include a single high pressure supply conduit 106. High pressure supply conduit 106 may be formed and/or extend through support 102 from area 50 to adjacent forward end 120 of unitary body 110 for HGP component 100. As similarly discussed herein, high pressure supply conduit 106 of support 102 may be in fluid communication and/or fluidly coupled to area 50 and HGP component 100 (e.g., high pressure fluid channel 160) (see, FIG. 8) to provide the high pressure fluid (HPF) from area 50 to HGP component 100 during operation of gas turbine system 10 (see, FIG. 1).

Additionally in the non-limiting example shown in FIG. 9, support 102 may include a low pressure fluid chamber 164. Low pressure fluid chamber 164 may be formed within support 102, radially adjacent to, and/or radially outward from HGP component 100. Low pressure fluid chamber 164 may be formed in support 102 to receive low pressure fluid (LPF) flowing through and/or within area 52 of turbine 28 that may be subsequently provided to HGP component 100 during operation of gas turbine system 10 (see, FIG. 1). For example, low pressure fluid chamber 164 may be fluidly coupled to and/or in fluid communication with at least one low pressure inlet 166, and at least one low pressure supply conduit 108 formed within support 102. In the non-limiting example low pressure inlet 166 may be in fluid communication with and/or fluidly coupled to area 52 within of turbine casing 36 that may contain LPF, and may be in fluid communication with and/or fluidly coupled to low pressure fluid chamber 164. Low pressure inlet 166 may receive the LPF from area 52 and provide the LPF to low pressure fluid chamber 164. Once received in low pressure fluid chamber 164, the LPF may be provided to the at least one low pressure supply conduit 108, and subsequently provided to low pressure fluid channel 138 (see, FIG. 5) of HGP component 100 via low pressure supply conduit 108, as similarly discussed herein.

Figure 10:
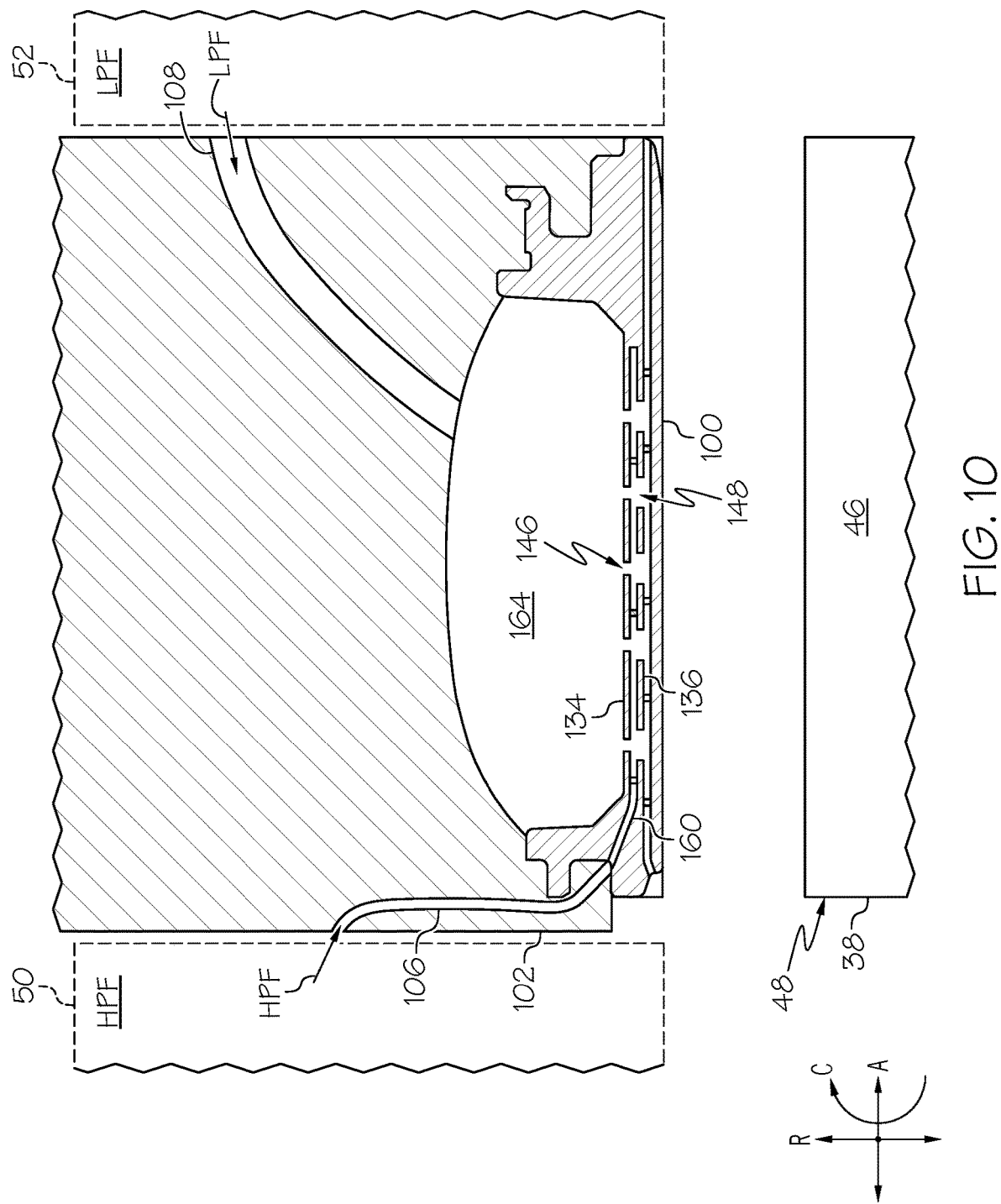
FIG. 10 shows an enlarged side view of a portion of the gas turbine system of FIG. 1, according to additional embodiments of the disclosure.
Figure 11:
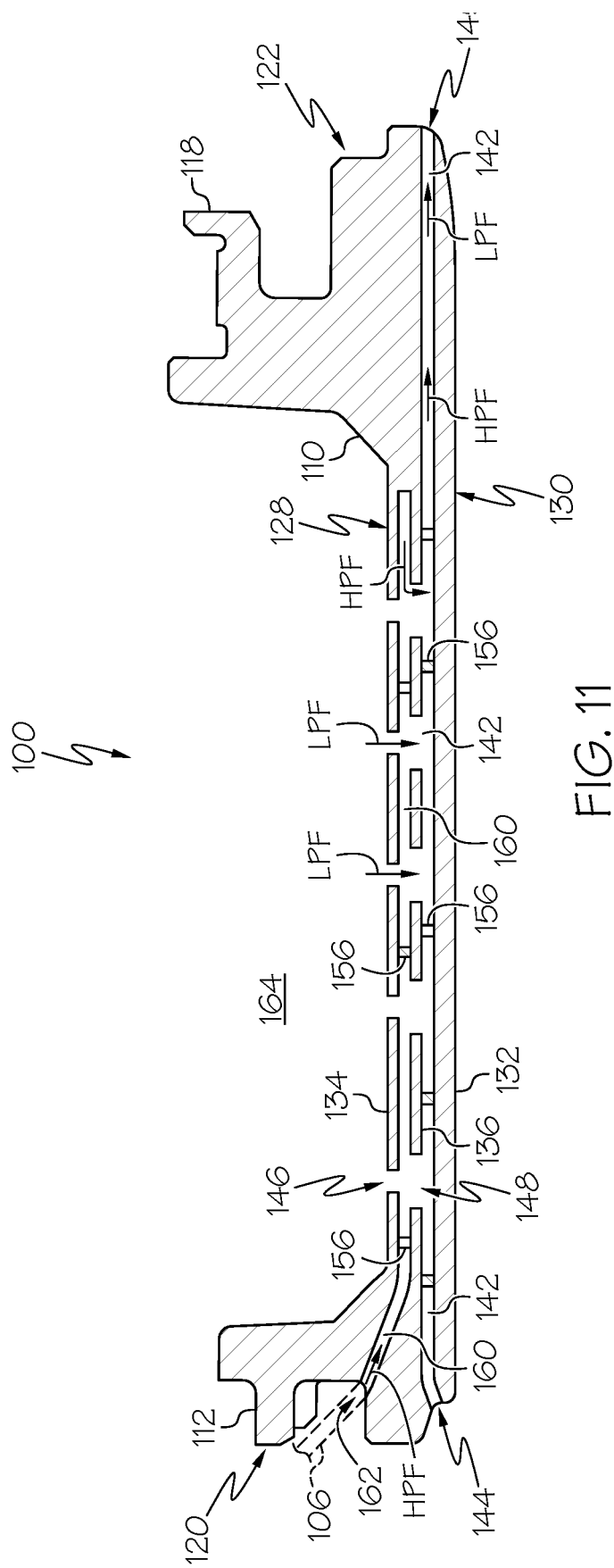
FIG. 11 shows a cross-sectional side view of the hot gas path component of FIG. 10, according to embodiments of the disclosure.

FIGS. 10 and 11 show various views of another non-limiting example of turbine 28 including HGP component 100 and support 102. Specifically, FIG. 10 shows an enlarged side view of a non-limiting example of a portion of turbine 28 of gas turbine system 10 (see, FIG. 1) including HGP component 100 coupled to support 102, and FIG. 11 shows a cross-sectional side view of another non-limiting example of HGP component 100 shown in FIG. 10. It is understood that similarly numbered and/or named components may function in a substantially similar fashion. Redundant explanation of these components has been omitted for clarity.

Similar to the non-limiting example shown in FIG. 9, support 102 may include low pressure fluid chamber 164. Low pressure fluid chamber 164 may be formed in support 102 radially adjacent to, and/or radially outward from HGP component 100. As discussed herein, low pressure fluid chamber 164 may receive low pressure fluid (LPF) flowing through and/or within area 52 of turbine 28. In the non-limiting example, low pressure fluid chamber 164 may be fluidly coupled to and/or in direct fluid communication with low pressure supply conduit 108 formed within support 102. Low pressure supply conduit 108 may be in fluid communication with and/or fluidly coupled to area 52 within of turbine casing 36 that may contain LPF, and may provide LPF to low pressure fluid chamber 164.

However, the non-limiting example shown in FIGS. 10 and 11 includes HGP component 100 and/or support 102 having distinct configurations than other non-limiting examples of HGP component 100 and/or support 102 discussed herein. For example, and distinct from the non-limiting example shown in FIG. 9, low pressure fluid chamber 164 may be fluidly coupled and/or in direct fluid communication with features of HGP component 100. More specifically, and as shown in FIGS. 10 and 11, low pressure fluid chamber 164 may be formed (radially) adjacent outer portion 134 of HGP component 100 such that outer portion 134 of HGP component 100 may at least partially form and/or define low pressure fluid chamber 164 within HGP component 100. Additionally, low pressure fluid chamber 164 may be fluidly coupled and/or in direct fluid communication with the plurality of nozzles 146 formed or extending through outer portion 134 of HGP component 100. As a result of being formed radially adjacent to and in direct fluid communication with the plurality of nozzles 146 extending through outer portion 134, low pressure fluid chamber 164 may provide LFP to each of the plurality of nozzles 146 when cooling HGP component 100, as discussed herein.

Support 102 may also include at least one high pressure supply conduit 106 formed therein. High pressure supply conduit 106 may be in direct fluid communication with and/or fluidly coupled to area 50 containing the HPF, as well as HGP component 100. More specifically, and as shown in FIGS. 10 and 11, high pressure supply conduit 106 may be in fluid communication with and/or may fluidly couple area 50 of turbine 28 (see, FIG. 10) and high pressure fluid channel 160 of HGP component 100 (see, FIG. 11) to provide HPF from area 50 to high pressure fluid channel 160 of HGP component 100. In the non-limiting example shown in FIG. 11, high pressure supply conduit 106 may be in fluid communication with high pressure fluid channel 160 via opening 162 formed through forward end 120 of HGP component 100. As a result of low pressure fluid chamber 164 being in direct fluid communication with nozzles 146, and distinct from the non-limiting examples discussed herein (e.g., FIG. 9), high pressure fluid channel 160 may be formed between and/or defined by outer portion 134 and intermediate portion 136 of body 110 for HGP component 100. Each of the plurality of venturi 148 formed or extending through intermediate portion 136 may in turn be fluidly coupled and/or in direct fluid communication with high pressure fluid channel 160 and may receive HPF when cooling HGP component 100, as discussed herein.

With reference to FIGS. 10 and 11, an example flow path of LPF and HPF through HGP component 100 is described. In the non-limiting example, LPF may flow from area 52, through low pressure supply conduit(s) 108 of support 102 (see, FIG. 10) to low pressure fluid chamber 164. From low pressure fluid chamber 164, the LPF may flow through the plurality of nozzles 146 formed through outer portion 134. In the non-limiting example where nozzles 146 are radially aligned and/or concentric with venturi 148, the LPF may flow directly into and/or through the venturi 148 formed through intermediate portion 136. Additionally or alternatively, LPF may flow from each of the plurality of nozzles 146 include high pressure fluid channel 160 formed between outer portion 134 and intermediate portion 136 of HGP component 100 shown in FIG. 11. The LPF may mix with and substantially be energized or increase in velocity with the HPF also flowing through venturi 148, as discussed herein. The LPF may flow through the venturi 148, may be diffused by diffuser 152 of intermediate portion 136, and may flow to cooling channel 142 of HGP component 100. Once inside cooling channel 142, the mixture of LPF and HPF may substantially cool inner portion 132 of HGP component 100 and may flow through cooling channel 142 toward forward end 120 or aft end 122 before being exhausted from HGP component via exhaust holes 144 of cooling channel 142.

Simultaneous to and/or independently of the LPF flowing through HGP component 100, HPF may flow from area 50, through high pressure supply conduit 106 formed in support 102 (see, FIG. 10). High pressure supply conduit 106 may be in direct fluid communication with opening 162 of high pressure fluid channel 160 formed through forward end 120 of HGP component 100. Once provided to high pressure fluid channel 160, the HPF may flow through the plurality of venturi 148 formed through intermediate portion 136. In the non-limiting example where a section (e.g., section 150; see, FIG. 6) of nozzles 146 extends into venturi 148, nozzles 146 may direct the HPF through venturi 148. Additionally where nozzles 146 are radially aligned and/or concentric with venturi 148 the HPF may flow directly into venturi 148 and may mix with the LPF. HPF flowing through high pressure fluid channel 160 and/or venturi 148 may substantially charge or increase the velocity of LPF flowing through venturi 148 from nozzles 146. Similar to the LPF, the HPF may flow through the venturi 148, may be diffused by diffuser 152 of intermediate portion 136, and may flow to cooling channel 142 of HGP component 100. Once inside cooling channel 142, the HPF, along with the LPF, may substantially cool inner portion 132 of HGP component 100 and may flow through cooling channel 142 toward forward end 120 or aft end 122 before being exhausted from HGP component via exhaust holes 144 and 145 of cooling channel 142 (see, FIG. 11).

Figure 12:
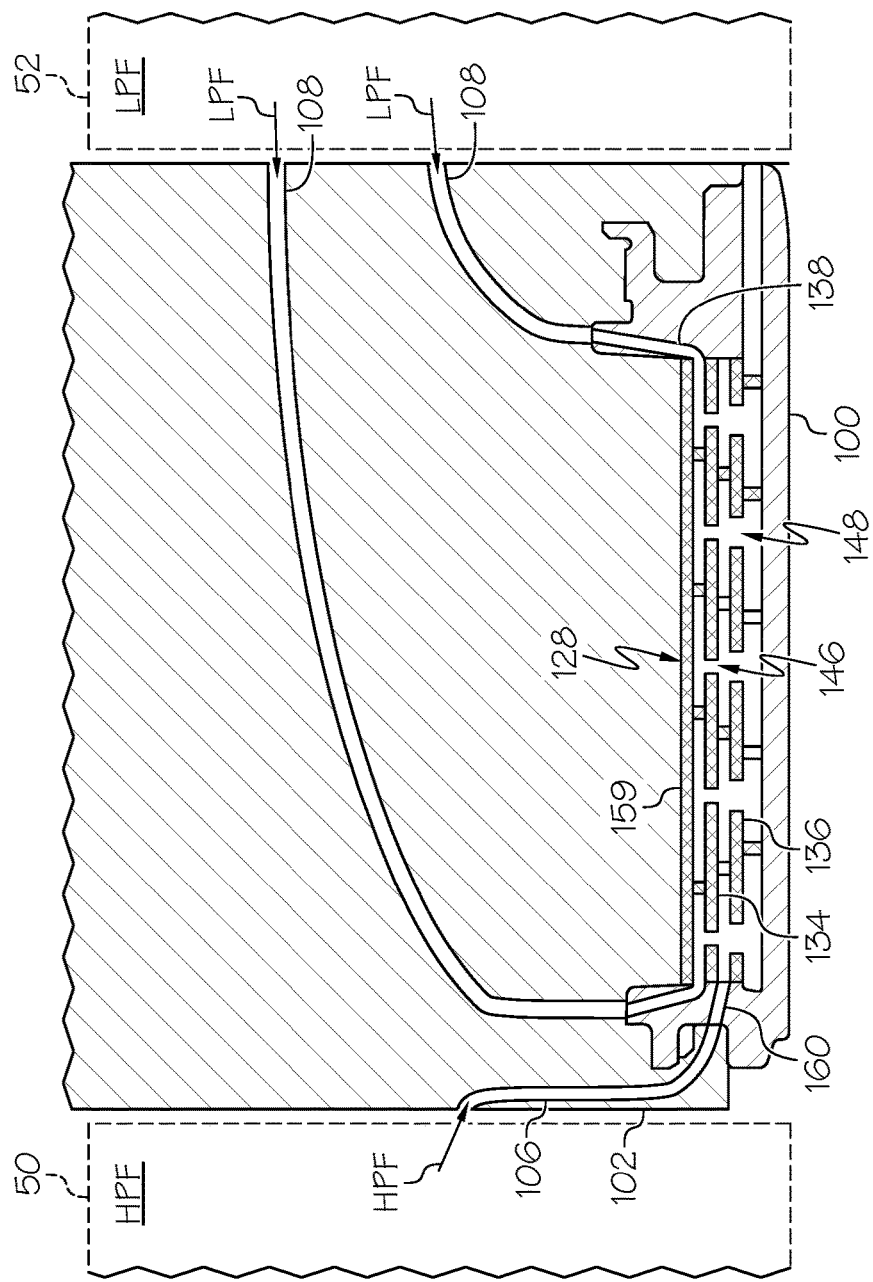
FIG. 12 shows an enlarged side view of a portion of the gas turbine system of FIG. 1, according to another embodiment of the disclosure.
Figure 13:
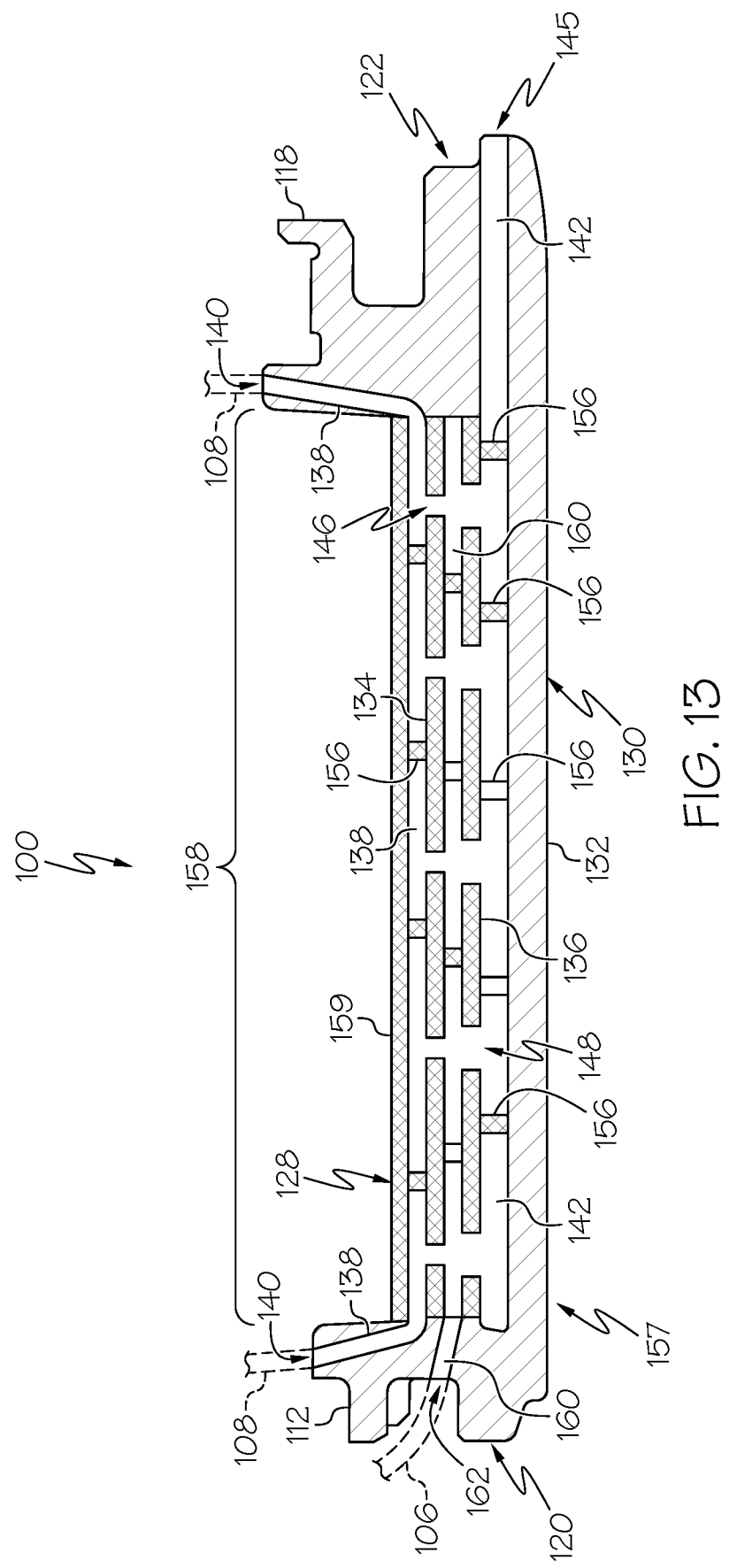
FIG. 13 shows a cross-sectional side view of the hot gas path component of FIG. 12, according to embodiments of the disclosure.

FIGS. 12 and 13 show various views of another non-limiting example of turbine 28 including HGP component 100 and support 102. Specifically, FIG. 12 shows an enlarged side view of a non-limiting example of a portion of turbine 28 of gas turbine system 10 (see, FIG. 1) including HGP component 100 coupled to support 102, and FIG. 13 shows a cross-sectional side view of another non-limiting example of HGP component 100 shown in FIG. 12. It is understood that similarly numbered and/or named components may function in a substantially similar fashion. Redundant explanation of these components has been omitted for clarity.

Similar to the non-limiting example shown in FIG. 7, support 102 shown in the non-limiting example of FIG. 12 may not include an internal pressure chamber (e.g., high pressure fluid chamber 104, low pressure fluid chamber 164). As such, and similar to FIGS. 7 and 8, HGP component 100 may include a top plate 159 formed radially outward, radially adjacent, and/or radially above outer portion 134 of HGP component 100. Top plate 159 may be positioned radially inward from and/or may substantially contact or abut a portion of support 102, as shown in FIG. 12.

However, the non-limiting example shown in FIGS. 12 and 13 includes HGP component 100 and/or support 102 having distinct configurations than other non-limiting examples (e.g., FIGS. 7 and 8) of HGP component 100 and/or support 102 discussed herein. For example, although support 102 includes high pressure supply conduit 106, and low pressure supply conduit 108, each supply conduit 106, 108 may be formed through support 102 in distinct areas and/or may be fluidly coupled to distinct portions of HGP component 100 than the non-limiting example discussed herein with respect to FIGS. 7 and 8. Specifically, support 102 may include a single high pressure supply conduit 106 formed therein. High pressure supply conduits 106 may extend through support 102, to adjacent forward end 120 of HGP component 100. High pressure supply conduit 106 may be in direct fluid communication and/or fluidly coupled directly to HGP component 100, and area 50, respectively, to provide HPF from area 50 to HGP component 100 during operation of gas turbine system 10 (see, FIG. 1). In the non-limiting example, high pressure supply conduit 106 may be fluidly coupled to and/or in direct fluid communication with high pressure fluid channel 160 via opening 162 (see, FIG. 13) formed through forward end 120 of HGP component 100. As shown in FIGS. 12 and 13, and similar to the non-limiting example shown in FIGS. 10 and 11, high pressure fluid channel 160 may be formed between and/or defined by outer portion 134 and intermediate portion 136 of body 110 for HGP component 100. Each of the plurality of venturi 148 formed or extending through intermediate portion 136 may in turn be fluidly coupled and/or in direct fluid communication with high pressure fluid channel 160 and may receive HPF when cooling HGP component 100. That is, HPF may flow from high pressure supply conduit 106 directly to high pressure fluid channel 160, and subsequently through the plurality of venturi 148 extending through intermediate portion 136. As similarly discussed herein with respect to FIGS. 10 and 11, HPF flowing through the plurality of venturi 148 may mix with LPF provided by the plurality of nozzles 146, into cooling channel 142 before being discharged from HGP component 100.

Additionally as shown in the non-limiting example of FIG. 12, support 102 may include a plurality of low pressure supply conduits 108. The plurality of low pressure supply conduits 108 may extend through support 102 toward forward end 120 and aft end 122, respectively, of HGP component 100. Additionally, each of the plurality of low pressure supply conduits 108 may be in direct fluid communication and/or fluidly coupled directly to HGP component 100. That is, each of the plurality of low pressure supply conduit 108 of support 102 may be in fluid communication and/or fluidly coupled to area 50, as well as low pressure fluid channel 138, via opening 140 (see, FIG. 13), of HGP component 100. As shown in FIGS. 12 and 13, low pressure fluid channel 138 may be formed between and/or defined by outer portion 134 and top plate 159 of body 110 for HGP component 100. Each of the plurality of nozzles 146 formed or extending through outer portion 134 may in turn be fluidly coupled and/or in direct fluid communication with low pressure fluid channel 138 and may receive LPF when cooling HGP component 100. That is, LPF may flow from each of the plurality of low pressure supply conduits 108 directly to low pressure fluid channel 138, and subsequently through the plurality of nozzles 146 extending through outer portion 134. From the plurality of nozzles 146, and as similarly discussed herein with respect to FIGS. 10 and 11, LPF flowing through the plurality of nozzles 146 may flow into the plurality of venturi 148, and may mix with HPF, before flowing into cooling channel 142 and being discharged from HGP component 100.

Figure 14:
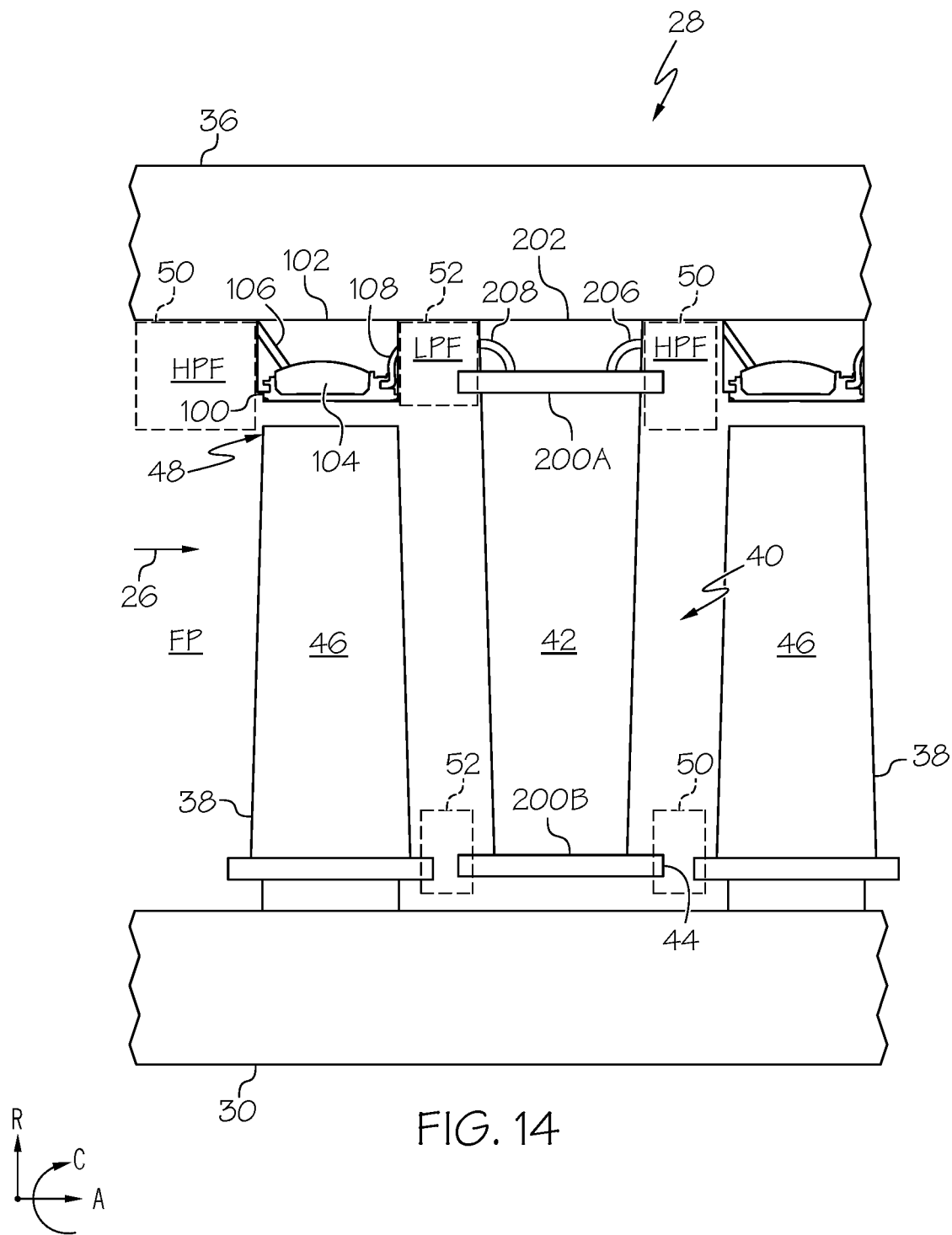
FIG. 14 shows a side view of a portion of a turbine of the gas turbine system of FIG. 1 including two turbine blades, a stator vane including a hot gas path component, a rotor, a casing, and a support, according to additional embodiments of the disclosure.
Figure 15:
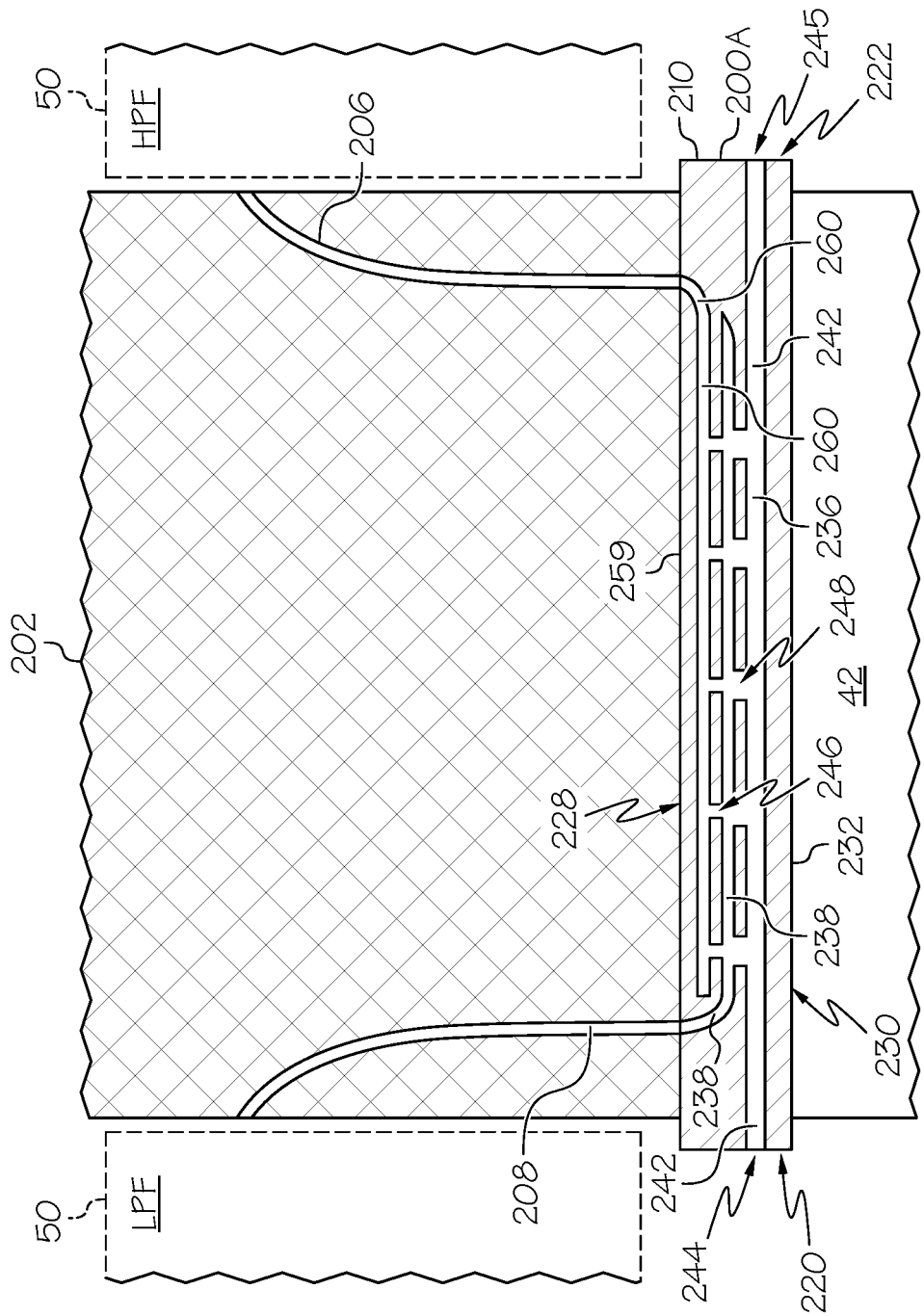
FIG. 15 shows an enlarged side view of a portion of the gas turbine system of FIG. 10, according to additional embodiments of the disclosure.

FIGS. 14 and 15 show additional views of another non-limiting example of HGP component 200 included in turbine 28 of gas turbine system 10. Specifically, FIG. 14 shows a side view of a portion of turbine 28 including two stages of turbine blades 38, and a stage of stator vanes 40 including HGP components 200A, 200B positioned within casing 36 of turbine 28, and FIG. 15 shows an enlarged portion of turbine 28 including HGP component 200A and support 202. It is understood that similarly numbered and/or named components may function in a substantially similar fashion. Redundant explanation of these components has been omitted for clarity.

In the non-limiting example shown in FIGS. 14 and 15, and as discussed herein with respect to FIG. 2, HGP components 200A, 200B may be formed as an outer platform and inner platform, respectively, of stator vane 40, and may be coupled and/or affixed to airfoil 42 of stator vane 40. Additionally as discussed herein, support 202 may extend radially inward from casing 36 of turbine 28, and may be configured to be coupled to and/or receive HGP component 200A (e.g., outer platform) of stator vanes 40 to couple, position, and/or secure stator vanes 40 to and/or within casing 36. In this non-limiting example shown in FIGS. 14 and 15, and similar to HGP component 100 and turbine shroud discussed herein (see, FIGS. 2-13), HGP component 200A and outer platform of stator vane 40 may be used interchangeably, and HGP component 200B and inner platform may be used interchangeably.

As shown in FIGS. 14 and 15, HGP components 200A, 200B and support 202 may be surrounded by high pressure fluid (HPF) and low pressure fluid (LPF) flowing within turbine 28. Specifically, area 52 positioned upstream of HGP component 200A and support 202 may include LPF, while area 50 positioned downstream of HGP component 200A and support 202 may include HPF. Additionally, area 52 positioned upstream of HGP component 200B may include LPF, and area 50 positioned downstream of HGP component 200B may include HPF.

Similar to HGP component 100 (e.g., turbine shroud) and support 102 discussed herein, HGP component 200A and support 202 may be configured to and/or may include features that may allow HGP component 200A to be cooled using HPF and LPF. For example, and as shown in FIG. 15, support 202 may include at least one high pressure supply conduit 206 formed therein. High pressure supply conduit 206 may be in fluid communication with and/or fluidly coupled to area 50 containing the HPF, as well as HGP component 200A. High pressure supply conduit 206 may receive the HPF flowing through area 50, and may provide the HPF directly to HGP component 200A, as discussed herein. Although shown in the non-limiting example as only including a single high pressure supply conduit 206, it is understood that support 202 may include a plurality of high pressure supply conduits 206 for providing HPF to HGP component 200A.

Support 202 may also include at least one low pressure supply conduit 208. Low pressure supply conduit(s) 208 may be in fluid communication with and/or fluidly coupled to area 52 containing LPF. As shown in FIG. 15, and discussed herein, low pressure supply conduit(s) 208 may be fluidly coupled to and/or in fluid communication with HGP component 200A to provide the LPF from area 52 to HGP component 200A during operation of turbine system 10 (see, FIG. 1).

HGP component 200A (e.g., outer platform) may also include a body including a plurality of surfaces, portions, fluid channels, nozzles, and venturi that may be used to cool HGP component 200A using HPF and LPF flowing through turbine 28. For example, and as shown in FIG. 15, HGP component 200A may include body 210. In the non-limiting example shown in FIG. 1, HGP component 200A may include and/or be formed as a unitary body 210 such that HGP component 200A is a single, continuous, and/or non-disjointed component or part. In the non-limiting example, unitary body 210 of HGP component 200A, and the various components and/or features of HGP component 200A, may be formed using any suitable additive manufacturing process (es) and/or method, as similarly discussed herein. In another non-limiting example, body 210 of HGP component 200A may be formed as multiple and/or distinct portions or components (not shown), as similarly discussed herein (see, FIGS. 7 and 8).

HGP component 200A may also include inner surface 230 positioned, formed, facing, directly exposed to, and/or partially defining the hot gas flow path (FP) of combustion gases 26 flowing through turbine casing 36 of turbine 28 for gas turbine system 10. Inner surface 230 of body 210 for HGP component 200A may be positioned radially adjacent to airfoil 42 of stator vane 40. In addition to facing the hot gas flow path (FP) of combustion gases 26, inner surface 230 of body 210 may also be formed and/or positioned between forward end 220 and aft end 222 of HGP component 200A.

As shown in FIG. 15, HGP component 200A may also include may include an inner portion 232. Inner portion 232 may be formed as an integral portion of (unitary) body 210 for HGP component 200A. Additionally, inner portion 232 may include inner surface 230, and/or inner surface 230 may be formed on inner portion 232 of body 210 for HGP component 200A. Inner portion 232 of body 210 for HGP component 200A may be formed, positioned, and/or extend between forward end 220 and aft end 222, and opposite sides (not shown) of HGP component 200A. Additionally, inner portion 232 may be formed integral with the solid side walls formed on the sides of body 210 (not shown). Inner portion 232 of HGP component 200A may also be positioned adjacent hot gas flow path (FP) for turbine 28 of turbine system 10.

HGP component 200A may also include an outer portion 234 formed radially opposite inner portion 232. Similar to inner portion 232, outer portion 234 may be formed as an integral portion of unitary body 210 for HGP component 200A. Outer portion 234 of body 210 for HGP component 200A may be formed, positioned, and/or extend between forward end 220 and aft end 222, and opposite sides (not shown) of body 210, respectively. Outer portion 234 of HGP component 200A may at least partially form and/or define various fluid channels within HGP component 200A, as discussed herein.

As shown in the non-limiting example of FIG. 15, HGP component 200A may also include an intermediate portion 236. Intermediate portion 236 may be formed (radially) between inner portion 232 and outer portion 234 of unitary body 210 of HGP component 200A. Similar to inner portion 232 and outer portion 234, and as shown in FIG. 1, intermediate portion 236 of HGP component 200A may be formed as an integral portion of body 210 for HGP component 200A. Intermediate portion 236 of body 210 for HGP component 200A may be formed, positioned, and/or extend between forward end 220 and aft end 222, and opposite sides of body 210, and may be formed integral with the solid side walls formed on the opposite sides (not shown).

HGP component 200A may also include top plate 259 formed radially outward, radially adjacent, and/or radially above outer portion 234 of body 210. Top plate 259 may be positioned radially inward from and/or may substantially contact or abut a portion of support 202. Top plate 259 may be formed from a substantially solid or continuous (e.g., no openings or venturi) component that may be formed, extend, and/or positioned substantially between forward end 220 and aft end 222, as well as opposite sides of body 210, respectively. In the non-limiting example, top plate 259 may form and/or define outer surface 228 of HGP component 200A.

Inner portion 232, outer portion 234, intermediate portion 236, and/or top plate 259 may at least partially form and/or define channels within HGP component 200A. For example, intermediate portion 236 and outer portion 234 may define and/or form a low pressure fluid channel 238 within HGP component 200A. More specifically, low pressure fluid channel 238 may be formed between intermediate portion 236 and outer portion 234 of unitary body 210 for HGP component 200A. Low pressure fluid channel 238 may extend substantially between forward end 220 and aft end 222, and opposite sides of unitary body 210. As discussed herein, low pressure fluid channel 238 may receive LPF via an opening(s) formed through HGP component 200A and in fluid communication with low pressure supply conduit(s) 208 of support 202.

In the non-limiting example shown in FIG. 15, intermediate portion 236 and inner portion 232 may also define and/or form a cooling channel 242 within HGP component 200A. That is, cooling channel 242 may be formed between intermediate portion 236 and inner portion 232 of unitary body 210 for HGP component 200A. Cooling channel 242 may extend substantially between forward end 220 and aft end 222, and opposite sides (not shown) of body 210. Cooling channel 238 may receive the HPF and low pressure fluid (LPF) to cool HGP component 200A during operation of gas turbine system 10 (see, FIG. 1), and may subsequently expel or exhaust the HPF and LPF from HGP component 10 via exhaust holes 244, 245.

HGP component 200A may also include high pressure fluid channel 260. High pressure fluid channel 260 may be formed between outer portion 234 and top plate 259. That is, top plate 259 and outer portion 234 for HGP component 200A may define and/or form high pressure fluid channel 260 within HGP component 200A. High pressure fluid channel 260 may extend substantially between forward end 220 and aft end 222, and opposite sides of body 210. High pressure fluid channel 260 may include an opening(s) fluidly coupled to high pressure supply conduit 206 to receive HPF from high pressure supply conduits 206 of support 202 and subsequently supply the HPF to high pressure fluid channel 260. In another non-limiting example (not shown), HGP component 200A may not include top plate 259. As such, high pressure fluid channel 260 may be formed between outer portion 234 and support 202, and may be in direct fluid communication with high pressure supply conduit 206 for receiving HPF, as discussed herein.

Additionally, and similar to HGP component 100 discussed herein with respect to FIGS. 2-9, HGP component 200A may include a plurality of nozzles 246 and venturi 248 formed therein. For example, outer portion 234 of HGP component 200A may include a plurality of openings or nozzles 246 (hereafter, "nozzles 146") formed therein or therethrough. Each of the plurality of nozzles 246 may be formed through outer portion 234 of unitary body 210 for HGP component 200A. The plurality of nozzles 246 formed through outer portion 234 may be in fluid communication with and/or fluidly coupled to high pressure fluid channel 260 of HGP component 200A. Additionally, and as shown in FIG. 15, the plurality of nozzles 246 formed through outer portion 134 may fluidly couple high pressure fluid channel 260 and low pressure fluid channel 238 of HGP component 200A. As discussed herein, each of the plurality of nozzles 246 formed through outer portion 234 may receive the HPF from the high pressure supply conduit 206 and/or high pressure fluid channel 260, and subsequently provide or flow the HPF to low pressure fluid channel 238 of HGP component 200A.

Also shown in the non-limiting example of FIG. 15, intermediate portion 236 may include a plurality of openings or venturi 248 (hereafter, "venturi 248") formed therein or therethrough. Each of the plurality of venturi 248 may be formed through intermediate portion 236 of body 210 for HGP component 200A. The plurality of venturi 248 formed through intermediate portion 236 may be in fluid communication with and/or may fluidly couple low pressure fluid channel 238 and cooling channel 242 formed within body 210 for HGP component 200A. Additionally, and because venturi 248 are in fluid communication with low pressure fluid channel 238, venturi 248 of HGP component 200A may also be in fluid communication with the LPF flowing through low pressure fluid channel 238, and/or may be in fluid communication with low pressure supply conduit(s) 208 of support 202 providing the LPF to low pressure fluid channel 238. As discussed herein, each of the plurality of venturi 248 formed through intermediate portion 236 may receive the LPF from low pressure fluid channel 238, and subsequently provide or flow the LPF to cooling channel 242. Additionally, and as discussed herein, each of the plurality of venturi 248 may receive the HPF flowing through low pressure fluid channel 238 via the plurality of nozzles 246, and subsequently provide or flow the HPF to cooling channel 242.

The plurality of nozzles 246 and venturi 248 formed within HGP component 200A may include substantially similar features as the plurality of nozzles 146 and venturi 148 of HGP component 100 discussed herein with respect to FIGS. 5 and 6. For example as shown in FIG. 15, the plurality of nozzles 246 formed in outer portion 234 and the plurality of venturi 248 formed in intermediate portion 236 of HGP component 200A may be radially and/or concentrically aligned. That is, each of the plurality of nozzles 246 may be aligned and/or substantially concentric with a corresponding venturi 248. Additionally, nozzles 246 may include a first dimension, for example a first diameter at throat (see e.g., FIG. 6) that is smaller than a second dimension or diameter of each venturi 248 at the throat (see e.g., FIG. 6) of venturi 248. Additionally, each venturi 248 may also include a diffuser (see e.g., FIG. 6) having a third dimension or diameter (see e.g., FIG. 6) that may be larger or greater than first dimension or diameter of nozzles 246 and second dimension or diameter of venturi 248. The various features of nozzles 246 and venturi 248 of HGP component 200A may aid in the mixing of HFP and LPF, and substantially energize or increase the velocity of the LPF to cool HGP component 200A during operation of turbine 28 of gas turbine system 10, as similarly discussed herein.

It is understood that HGP component 200B formed as inner platform of stator vane 40 may include similar features as HGP component 200A discussed herein with respect to FIGS. 14 and 15. More specifically, HGP component 200B of stator vane 40 may include a body including a plurality of surfaces, portions, fluid channels, nozzles, and venturi that may be substantially identical to that of HGP component 200A. However distinct from HGP component 200A, HGP component 200B may include a low pressure fluid channel (e.g., low pressure fluid channel 238) in direct fluid communication with area 52 positioned adjacent rotor 30 of turbine 28, and a high pressure fluid channel (e.g., high pressure fluid channel 260) in direct fluid communication with area 50 positioned adjacent rotor 30. As similarly discussed herein, area 52 may include LPF and area 50 may include HPF, which may be used to cool HGP component 200B during operation of turbine 28. In another non-limiting example (not shown), HPF and LPF may be supplied from areas 50, 52 positioned adjacent casing 36, and subsequently supplied to HGP component 200B via conduits formed through airfoil 46.

Similar to those non-limiting examples shown and discussed herein with respect FIGS. 10-13, features and/or components of HGP components 200A, 200B may be positioned in distinct portions and/or configured different than the non-limiting example shown in FIG. 15. For example, low pressure fluid channel 238 in fluid communication with low pressure supply conduit 208 may formed, positioned, and/or defined between top plate 259 and outer plate 234 including the plurality of nozzles 246. Additionally, high pressure fluid channel 260 in fluid communication with high pressure supply conduit 206 may be formed, positioned, and/or defined between outer plate 234 and intermediate plate 236 including the plurality of venturi 248. As similarly discussed herein with respect to FIGS. 12 and 13, LPF flowing through the plurality of nozzles 246 in HGP component 200A, 200B may flow into and mix with HPF flowing through the plurality of venturi 248, before flowing into cooling channel 242 and being discharged from HGP component 200A, 200B.

Figure 16:
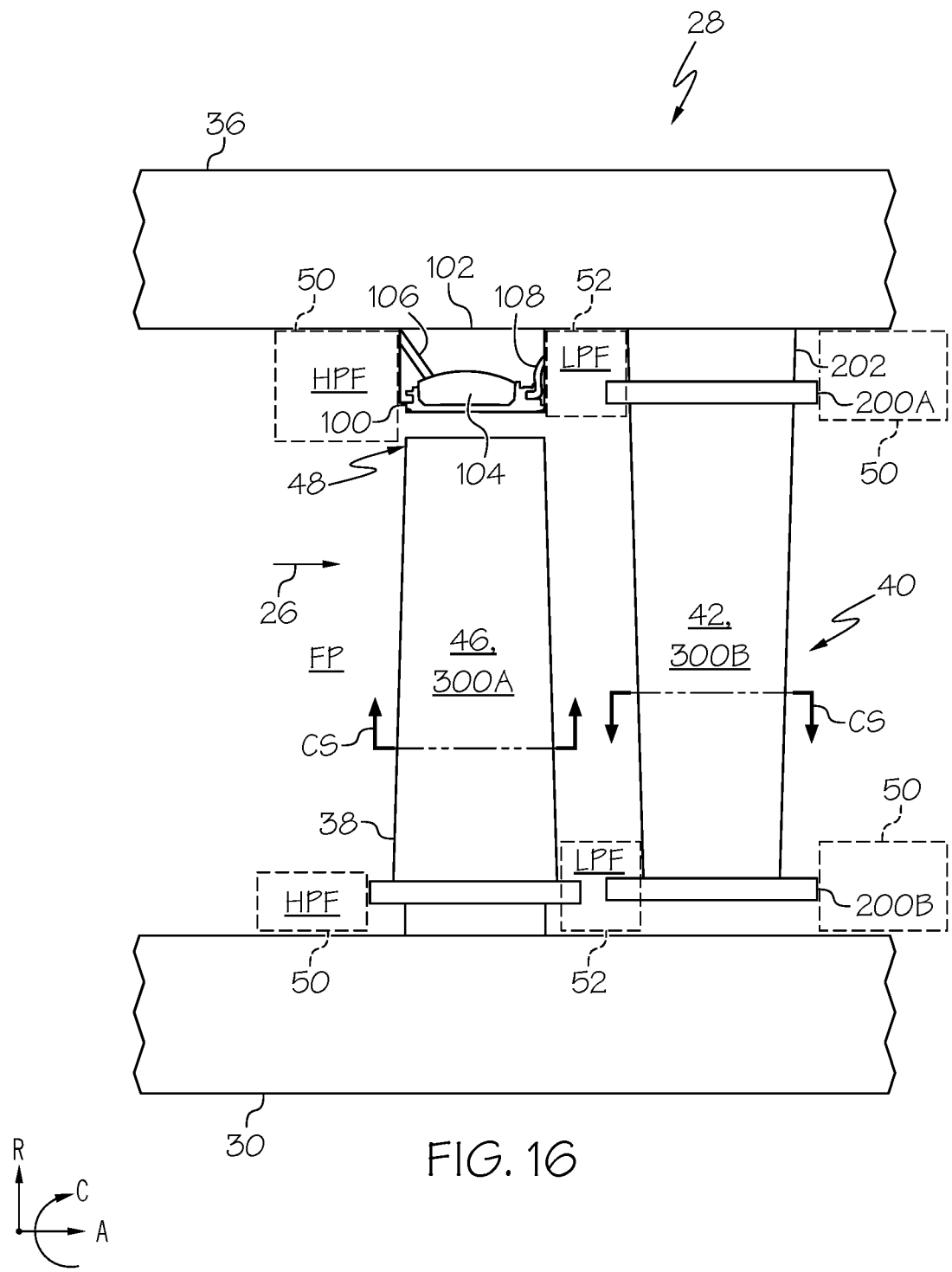
FIG. 16 shows a side view of a portion of a turbine of the gas turbine system of FIG. 1 including a turbine blade, a stator vane, a rotor, a casing, a hot gas path component, and a support, according to embodiments of the disclosure.
Figure 17:
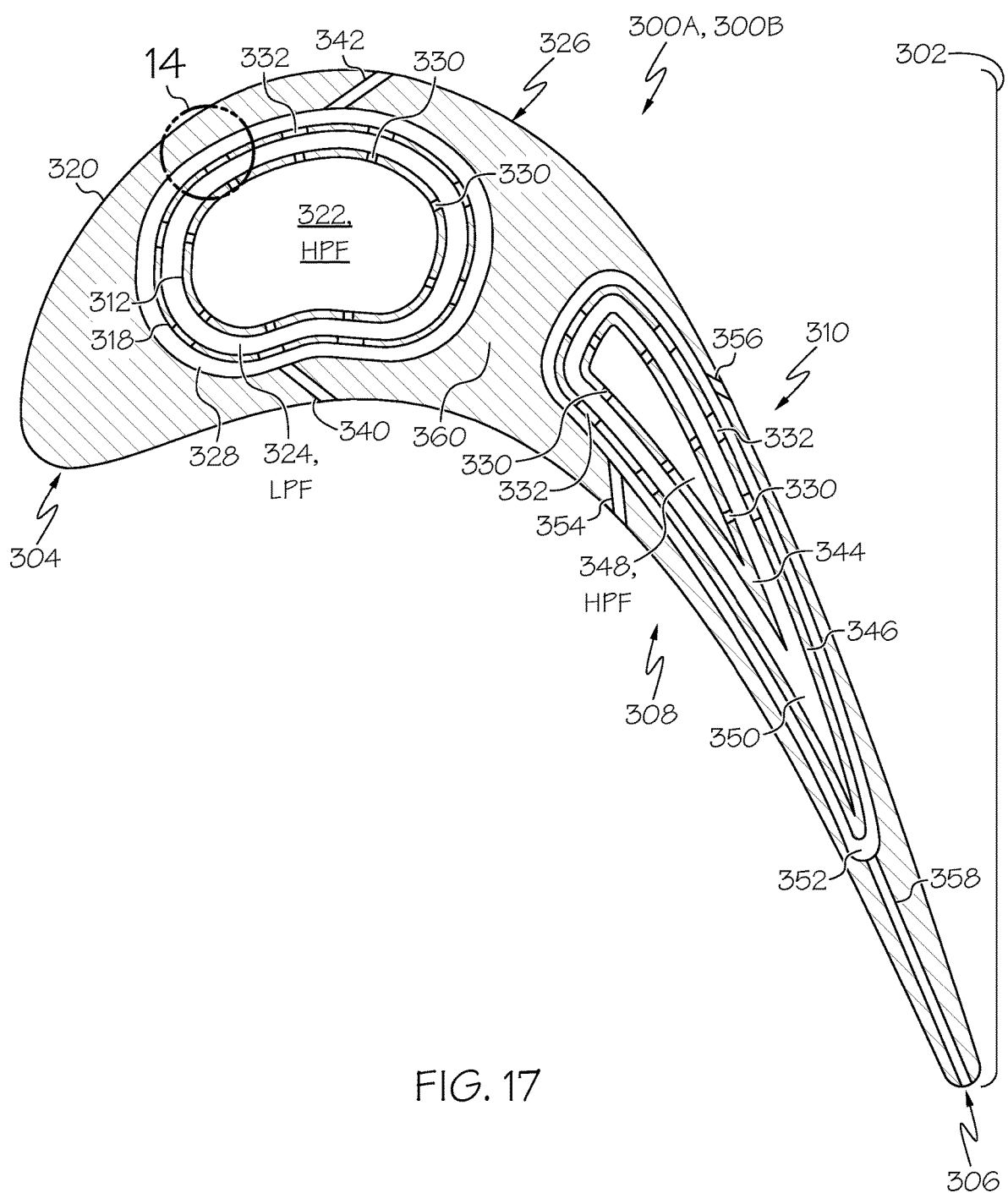
FIG. 17 shows a top cross-sectional view of the airfoil of the turbine blade or stator vane of shown in FIG. 16, taken along line CS-CS, according to embodiments of the disclosure.

FIGS. 16 and 17 show additional views of another non-limiting example of HGP components included in turbine 28 of gas turbine system 10. Specifically, FIG. 16 shows a side view of a portion of turbine 28 including a stage of turbine blades 38 including HGP component 300A, and a stage of stator vanes 40 including HGP component 300B, and FIG. 17 shows a top, cross-sectional view of HGP component 300A and/or 300B taken along line(s) CS-CS in FIG. 16. In the non-limiting example, HGP components 300A may be formed as airfoil 46 of turbine blade 38, and HGP component 300B may be formed as airfoil 42 of stator vane 40. As discussed herein with respect to FIGS. 16 and 17, HGP component 300A and airfoil 46 of turbine blade 38 may be used interchangeably, and HGP component 300B and airfoil 42 of stator vane 40 may be used interchangeably. The non-limiting example of the portion of turbine 28 shown FIG. 16 may be substantially similar to the portion of turbine 28 shown and discussed herein with respect to FIG. 2. It is understood that similarly numbered and/or named components may function in a substantially similar fashion. Redundant explanation of these components has been omitted for clarity.

Turning to FIG. 17, with continued reference to FIG. 16, the various features of HGP component 300A, 300B are discussed herein. It is understood that HGP component 300A formed as airfoil 46 of turbine blade 38 and HGP component 300B formed as airfoil 42 of stator vane 40 may include substantially similar features. Additionally, it is understood that turbine 28 of gas turbine system 10 (see, FIG. 1) may include HGP component 300A and/or HGP component 300B to be used during operation.

HGP component 300A, 300B may include a body 302. In the non-limiting example shown in FIG. 17, HGP component 300A, 300B, and the various components and/or features of HGP component 300A, 300B, may include and/or be formed as a unitary body 302 such that HGP component 300A, 300B is a single, continuous, and/or non-disjointed component or part. In the non-limiting example where HGP component 300A, 300B includes a unitary body, HGP component 300A, 300B may not require the building, joining, coupling, and/or assembling of various parts to completely form HGP component 300A, 300B, and/or may not require building, joining, coupling, and/or assembling of various parts before HGP component 300A, 300B can be installed and/or implemented within turbine system 10 (see, FIG. 1). Rather, once single, continuous, and/or non-disjointed unitary body 302 for HGP component 300A, 300B is built, as discussed herein, HGP component 300A, 300B may be immediately installed within turbine system 10.

In the non-limiting example, unitary body 302 of HGP component 300A, 300B, and the various components and/or features of HGP component 300A, 300B, may be formed using any suitable additive manufacturing process(es) and/or method. For example, HGP component 300A, 300B including unitary body 302 may be formed by direct metal laser melting (DMLM) (also referred to as selective laser melting (SLM)), direct metal laser sintering (DMLS), electronic beam melting (EBM), stereolithography (SLA), binder jetting, or any other suitable additive manufacturing process(es). Additionally, unitary body 302 of HGP component 300A, 300B may be formed from any material that may be utilized by additive manufacturing process(es) to form HGP component 300A, 300B, and/or capable of withstanding the operational characteristics (e.g., exposure temperature, exposure pressure, and the like) experienced by HGP component 300A, 300B within gas turbine system 10 during operation.

In another non-limiting example, body 302 of HGP component 300A, 300B may be formed as multiple and/or distinct portions or parts (see, FIG. 17). For example, and as discussed herein, body 302 of HGP component 300A, 300B may be formed from a first part that may include an outer wall, and at least one distinct part that may include additional portions or walls forming HGP component 300A, 300B. The distinct parts forming body 302 of HGP component 300A, 300B may be joined, coupled, and/or affixed to one another to form HGP component 300A, 300B before being installed in turbine 28 within gas turbine system 10. Each part forming body 302, and the various components and/or features of HGP component 300A, 300B, may be formed using any suitable manufacturing process(es) and/or method. For example, body 302 including distinct parts may be formed by milling, turning, cutting, casting, molding, drilling, and the like.

HGP component 300A, 300B may also include various edges and sides. For example, and as shown in FIG. 17, body 302 of HGP component 300A, 300B may include a leading edge 304 and a trailing edge 306 formed opposite the leading edge 304. Additionally, body 302 of HGP component 300A, 300B may include a pressure side 308, and a suction side 310 positioned opposite pressure side 308. Both pressure side 308 and suction side 310 of HGP component 300A, 300B may extend between leading edge 304 and trailing edge 306 of body 302. During operation combustion gas 26 (see, FIG. 16) may flow from leading edge 304 to trailing edge 306, and over pressure side 308 and suction side 310, respectively, to drive and/or rotate rotor 30, as discussed herein.

As shown in FIG. 17, body 302 of HGP component 300A, 300B may also include a plurality of distinct walls. For example, body 302 of HGP component 300A, 300B may include an inner wall 312, an intermediate wall 318, and an outer wall 320 formed adjacent leading edge 304. Inner wall 312 may extend radially through HGP component 300A, 300B. In the non-limiting example where HGP component 300A, 300B is formed as airfoil 42, 46, inner wall 312 may extend radially through a portion of airfoil 46 between platform 47 and tip portion 48 of turbine blade 38 and/or through a (radial) portion of airfoil 42 between outer platform 200A and inner platform 200B of stator vane 40. Inner wall 312 may be formed and/or shaped as a substantially open cylinder. That is, and as shown in FIG. 17, inner wall 312 of body 302 may including an opening, and/or may surround and define a high pressure fluid chamber 322 formed in HGP component 300A, 300B. Similar to inner wall 312, high pressure fluid chamber 322 may extend radially through HGP component 300A, 300B. In the non-limiting example shown in FIG. 17, high pressure fluid chamber 322 defined by inner wall 312 may extend radially through and/or be formed in a portion of airfoil 46 between platform 47 and tip portion 48 of turbine blade 38, and/or extend radially through and/or be formed in portion of airfoil 42 between outer platform 200A and inner platform 200B of stator vane 40. As discussed herein, high pressure fluid chamber 322 may receive high pressure fluid (HPF) flowing through a portion of turbine 28 (e.g., area 50; FIG. 16), and may subsequently flow or direct the HPF through the various walls 312, 318, 320 of body 302 to cool HGP component 300A, 300B during operation of turbine 28.

Body 302 of HGP component 300A, 300B may also include intermediate wall 318. Intermediate wall 318 may extend radially through HGP component 300A, 300B. In the non-limiting example where HGP component 300A, 300B is formed as airfoil 42, 46, intermediate wall 318 may extend radially through a portion of airfoil 46 between platform 47 and tip portion 48 of turbine blade 38 and/or through a (radial) portion of airfoil 42 between outer platform 200A and inner platform 200B of stator vane 40. Additionally, and as shown in FIG. 17, intermediate wall 318 may be positioned adjacent to, separated from, and/or may substantially surround inner wall 312 of body 302 for HGP component 300A, 300B. That is, intermediate wall 318 may also be formed and/or shaped as a substantially open cylinder and may substantially surround or encircle inner wall 312. As a result, and as shown in the non-limiting example of FIG. 17, intermediate wall 318 may surround, and together with inner wall 312 may define, a low pressure fluid chamber 324 formed in HGP component 300A, 300B. Similar to high pressure fluid chamber 322, low pressure fluid chamber 324 may extend radially through HGP component 300A, 300B. In the non-limiting example, low pressure fluid chamber 324 defined by and/or formed between intermediate wall 318 and inner wall 312 may extend radially through and/or be formed in a portion of airfoil 46 between platform 47 and tip portion 48 of turbine blade 38, and/or extend radially through and/or be formed in portion of airfoil 42 between outer platform 200A and inner platform 200B of stator vane 40. Additionally, low pressure fluid chamber 324 may be positioned adjacent to and/or extend substantially parallel to high pressure fluid chamber 322 of HGP component 300A, 300B. As discussed herein, low pressure fluid chamber 324 may receive low pressure fluid (LPF) flowing through a portion of turbine 28 (e.g., area 52; FIG. 16), and may subsequently flow or direct the LPF through the various walls 318, 320 of body 302 to cool HGP component 300A, 300B during operation of turbine 28.

Additionally in the non-limiting example shown in FIG. 17, body 302 of HGP component 300A, 300B may include outer wall 320. Outer wall 320 may form an exposed or outer surface 326 of body 302 of HGP component 300A, 300B. Where HGP component 300A, 300B is formed as airfoil 42, 46, outer wall 320 may extend between platform 47 and tip portion 48 of turbine blade 38 and/or may extend between outer platform 200A and inner platform 200B of stator vane 40. Additionally in the non-limiting example, outer wall 320 of airfoil 42, 46 (e.g., HGP component 300A, 300B) may include outer surface 326 that may be exposed and/or come in contact with combustion gas 26 during operation of turbine 28 (see, FIG. 16). As shown in FIG. 17, outer wall 320 may be positioned adjacent to, separated from, and/or may substantially surround inner wall 312 and intermediate wall 318, respectively, of body 302 for HGP component 300A, 300B. That is, outer wall 320 may also be formed and/or shaped as a substantially open cylinder and may substantially surround or encircle intermediate wall 318, and in turn inner wall 312 as well. As a result, and as shown in the non-limiting example of FIG. 17, outer wall 320 may surround, and together with intermediate wall 318 may define, a cooling channel 328 formed in HGP component 300A, 300B. Similar to fluid chambers 322, 324 discussed herein, cooling channel 328 may extend radially through HGP component 300A, 300B. In the non-limiting example, cooling channel 328 defined by and/or formed between intermediate wall 318 and outer wall 320 may extend radially through and/or be formed in a portion of airfoil 46 between platform 47 and tip portion 48 of turbine blade 38, and/or extend radially through and/or be formed in portion of airfoil 42 between outer platform 200A and inner platform 200B of stator vane 40. Additionally, cooling channel 328 may be positioned adjacent to and/or extend substantially parallel to high pressure fluid chamber 322 and low pressure fluid chamber 324, respectively, of HGP component 300A, 300B. Cooling channel 328 may also extend radially through body 302 adjacent and opposite outer surface 326 included in outer wall 320 of HGP component 300A, 300B. As discussed herein, cooling channel 328 may receive HPF and LPF flowing through the various walls 312, 318 of body 302 to cool HGP component 300A, 300B, and more specifically outer wall 320 during operation of turbine 28.

In the non-limiting example shown in FIG. 17, the various walls 312, 318, 320 of body 302 may be formed integral with one another such that body 302 is a unitary body. That is, and as discussed herein, inner wall 312, intermediate wall 318, and outer wall 320 of body 302 may be formed integral with one another, and/or may be formed as a single, continuous, and/or non-disjointed component or part. Unitary body 302 of HGP component 300A, 300B including inner wall 312, intermediate wall 318, and outer wall 320 may be formed using any suitable additive manufacturing process(es) and/or method, as similarly discussed herein. In other non-limiting examples discussed herein (see, FIG. 17), inner wall 312, intermediate wall 318, and/or outer wall 320 of body 302 may be formed from distinct parts and may be assembled and/or joined before HGP component 300A, 300B is included within turbine 28.

Figure 18:
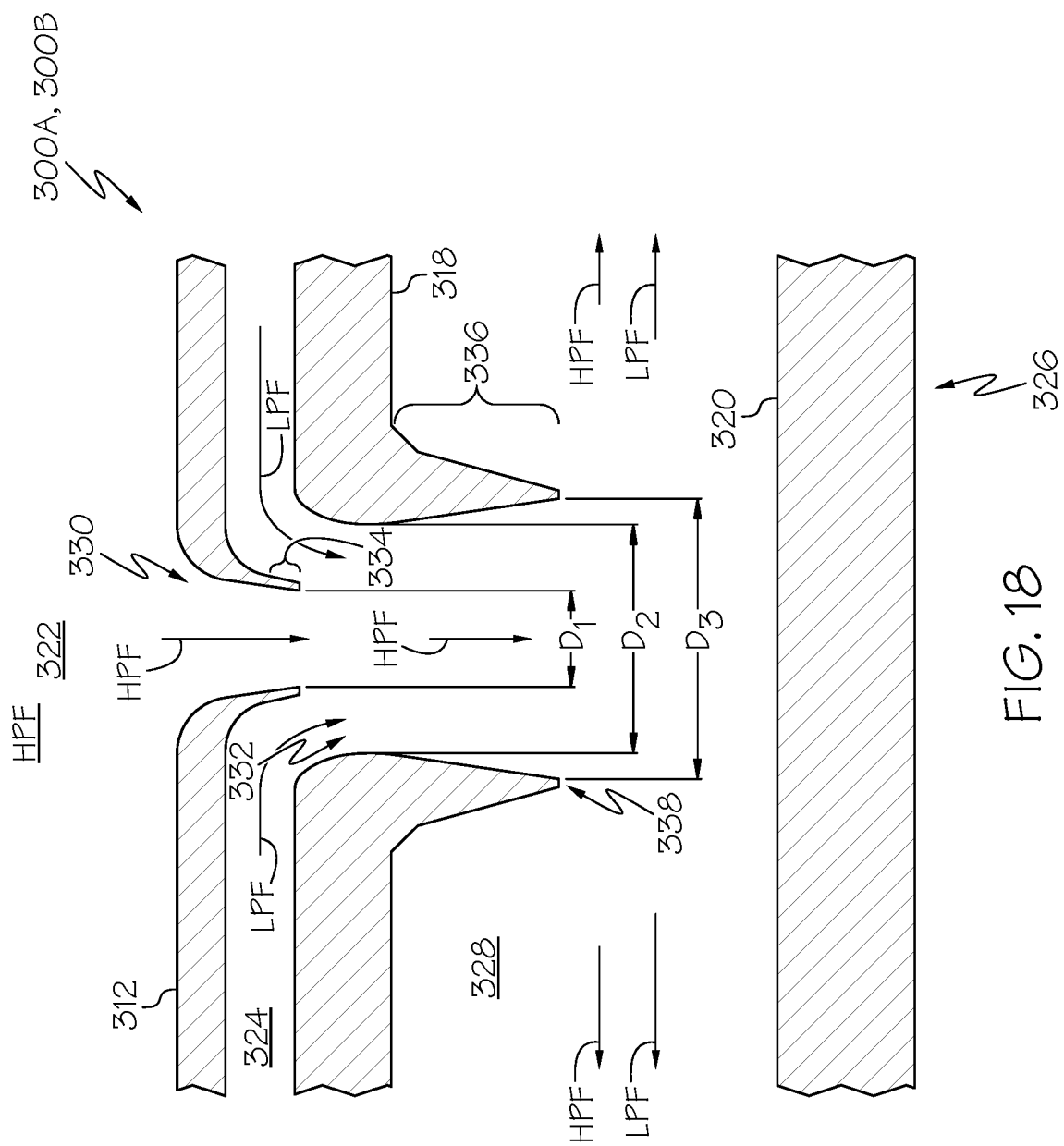
FIG. 18 shows an enlarged cross-sectional side view of the airfoil of FIG. 17, according to embodiments of the disclosure.

In order to provide the HPF and the LPF within the various portions (e.g., chambers 322, 324, cooling channel 328) of HGP component 300A, 300B to cool the component, HGP component 300A, 300B may also include a plurality and/or array of openings formed therein. For example, inner wall 312 and intermediate wall 318 of HGP component 300A, 300B may each include a plurality and/or array of openings, nozzles, and/or venturi. Turning to FIG. 18, with continued reference to FIG. 17, inner wall 312 may include a plurality of high pressure openings or nozzles 330 (hereafter, "high pressure nozzles 330") formed therein or therethrough. Each of the plurality of high pressure nozzles 330 may be formed through inner wall 312 of body 302 for HGP component 300A, 300B. The plurality of high pressure nozzles 330 formed or extending through inner wall 312 may be in fluid communication with and/or fluidly coupled to high pressure fluid chamber 322. Additionally, and as shown in FIGS. 17 and 18, the plurality of high pressure nozzles 330 formed through inner wall 312 may fluidly coupled to and/or in fluid communication with low pressure fluid chamber 324 formed between inner wall 312 and intermediate wall 318. As such, the plurality of high pressure nozzles 330 may fluidly couple high pressure fluid chamber 322 and low pressure fluid chamber 324 of HGP component 300A, 300B. As discussed herein, each of the plurality of high pressure nozzles 330 formed through inner wall 312 may receive the HPF from high pressure fluid chamber 322, and subsequently provide or flow the HPF to low pressure fluid chamber 324 of HGP component 300A, 300B.

Also shown in the non-limiting example of FIGS. 17 and 18, intermediate wall 318 may include a plurality of low pressure openings or venturi 332 (hereafter, "low pressure venturi 332") formed therein or therethrough. Each of the plurality of low pressure venturi 332 may be formed or extend through intermediate wall 318 of body 302 for HGP component 300A, 300B. The plurality of low pressure venturi 332 formed or extending through intermediate wall 318 may be in fluid communication with and/or may fluidly couple low pressure fluid chamber 324 and cooling channel 328 formed within body 302 for HGP component 300A, 300B. As discussed herein, each of the plurality of low pressure venturi 332 formed through intermediate wall 318 may receive the LPF from low pressure fluid chamber 324, and subsequently provide or flow the LPF to cooling channel 328. Additionally, and as discussed herein, each of the plurality of low pressure venturi 332 may receive the high pressure fluid (HPF) flowing through low pressure fluid chamber 324 via the plurality of high pressure nozzles 330, and subsequently provide or flow the HPF to cooling channel 328.

In the non-limiting example shown in FIGS. 17 and 18, the plurality of high pressure nozzles 330 formed in inner wall 312 and the plurality of low pressure venturi 332 formed in intermediate wall 318 of HGP component 300A, 300B may be (concentrically) aligned. That is, each of the plurality of high pressure nozzles 330 may be aligned and/or substantially concentric with a corresponding low pressure venturi 332. Additionally, and as shown in the non-limiting example FIG. 18, each of the plurality of high pressure nozzles 330 formed in inner wall 312 may include a section 334 that may extend into a corresponding low pressure venturi 332 formed in intermediate wall 318. Specifically, section 334 of high pressure nozzles 330 may extend into and/or may be positioned partially within and/or surrounded by the concentrically aligned, corresponding low pressure venturi 332 of HGP component 300A, 300B. As discussed herein, section 334 of each high pressure nozzle 330 may extend into corresponding low pressure venturi 332 to direct HPF through low pressure venturi 332. Additionally, or alternatively, section 334 of each high pressure nozzle 330 may extend into corresponding low pressure venturi 332 to direct low pressure fluid (LPF) flowing through low pressure fluid chamber 324 into low pressure venturi 332, and/or prevent the LPF from flowing through high pressure nozzles 330 and/or inner wall 312.

As shown in FIG. 18, each of the plurality of high pressure nozzles 330 may be sized differently and/or may include a distinct dimension than the plurality of low pressure venturi 332. That is, a dimension (e.g., diameter) of the plurality of high pressure nozzles 330 may be distinct from a dimension of the plurality of low pressure venturi 332. In the non-limiting example, each of the plurality of high pressure nozzles 330 formed in inner wall 312 may include a first diameter ($D_1$) at the throat or neck (e.g., narrowest part; section 334) of the nozzle opening or configuration. Additionally, each of the plurality of low pressure venturi 332 formed in intermediate wall 318 may include a second diameter ($D_2$) at the throat (e.g., narrowest part) of the venturi opening or configuration. As shown in the non-limiting example in FIG. 18, the second diameter ($D_2$) of each low pressure venturi 332 may be greater or larger than the first diameter ($D_1$) of high pressure nozzle 330. In non-limiting examples the second diameter of low pressure venturi 332 may be at least twice as large (e.g., 2:1 ratio or greater) than the first diameter ($D_1$) of high pressure nozzle 330. In other non-limiting examples, the second diameter of low pressure venturi 332 may be marginally larger (e.g., 10% larger) than the first diameter ($D_1$) of high pressure nozzle 330. The size or dimension of each of the first diameter ($D_1$) and the second diameter ($D_2$), as well as the difference in size between first diameter ($D_1$) and the second diameter ($D_2$) may improve the velocity and/or pressure of the HPF and LPF flowing through HGP component 300A, 300B, as discussed herein.

It is understood that the size and/or number of nozzles 330 and venturi 332 formed within HGP component 300A, 300B, as shown in FIGS. 17 and 18, is merely illustrative. As such, HGP component 300A, 300B may include larger or smaller nozzles 330 and venturi 332, and/or may include more or less nozzles 330 and venturi 332 formed therein. Additionally, although the high pressure nozzles 330 and low pressure venturi 332 are both shown to be substantially uniform in size and/or shape, it is understood that each of the plurality of nozzles 330 and venturi 332 formed in HGP component 300A, 300B may include distinct sizes and/or shapes. The sizes, shapes, and/or number of nozzles 330 and venturi 332 formed in HGP component 300A, 300B may depend at least in part on various parameters (e.g., exposure temperature, exposure pressure, position within turbine casing 36, HPF operational pressure/temperature, LPF operational pressure/temperature, and the like) of gas turbine system 10 during operation. Additionally, or alternatively, the sizes, shapes, and/or number of nozzles 330 and venturi 332 formed in HGP component 300A, 300B may be dependent, at least in part on the characteristics (e.g., inner wall 312 thickness, intermediate wall 318 thickness, volume of chambers 322, 324, volume of cooling channel 328, and so on) of HGP component 300A, 300B.

Additionally as shown in FIG. 18, intermediate wall 318 of body 302 for HGP component 300A, 300B may also include a plurality of diffusers 336. Each of the plurality of diffusers 336 may be formed integral with a corresponding low pressure venturi 332 formed through intermediate wall 318. That is, and as shown in FIG. 18, diffuser 336 may be formed integral with each low pressure venturi 332 and may be positioned radially adjacent the low pressure venturi 332, and more specifically the throat (e.g., narrowest part) of each low pressure venturi 332. Diffuser 336 may also be formed adjacent and/or extend radially toward outer wall 320 of body 302 of HGP component 300A, 300B. In the non-limiting example, diffuser 336 may include a diverging shape, geometry, and/or configuration that gets larger or wider as diffuser 336 extends closer toward outer wall 320 of HGP component 300A, 300B. In the non-limiting example, the largest dimension (e.g., diameter) of diffuser 336 may be formed at an end 338 adjacent outer wall 320. End 338 of diffuser 336 may include a third diameter ($D_3$), that may be larger or greater than first diameter ($D_1$) of high pressure nozzles 330 and second diameter ($D_2$) of low pressure venturi 332. In additional to the size or dimension of each of the first diameter ($D_1$) and the second diameter ($D_2$), the size of the third dimension ($D_3$) of each diffuser 336 of HGP component 300A, 300B may increase a static pressure of the HPF and LPF flowing through HGP component 300A, 300B, as discussed herein.

Returning to FIG. 17, HGP component 300A, 300B may also include at least one cooling hole 340, 342. More specifically, body 302 of HGP component 300A, 300B may include cooling hole(s) 340, 342 formed and/or extending through outer wall 320. In the non-limiting example, a first cooling hole 340 may extend through outer wall 320 on pressure side 308 of body 302 of HGP component 300A, 300B, and second cooling hole 342 may extend through outer wall 320 on suction side 310. Additionally, cooling hole(s) 340, 342 may be formed and/or may extend through outer surface 326 of outer wall 320 of body 302. Cooling hole(s) 340, 342 may be fluidly coupled and/or in fluid communication with cooling channel 328. As discussed herein, cooling fluid (e.g., HPF, LPF) may flow through cooling channel 328 before being exhausted from HGP component 300A, 300B via cooling holes 340, 342 in fluid communication with cooling channel 328.

Although two cooling holes 340, 342 are shown formed in HGP component 300A, 300B and in fluid communication with cooling channel 328, it is understood that the number of cooling holes formed within HGP component 300A, 300B is merely illustrative. As such, HGP component 300A, 300B may include more or less cooling holes formed therein for exhausting the cooling fluid (e.g., HPF, LPF) from HGP component 300A, 300B during operation. The number of cooling holes formed in HGP component 300A, 300B may depend at least in part on various parameters (e.g., exposure temperature, exposure pressure, position/stage within turbine casing 36, HPF operational pressure/temperature, LPF operational pressure/temperature, and the like) of gas turbine system 10 during operation. Additionally, or alternatively, the number of cooling holes formed in HGP component 300A, 300B may be dependent, at least in part on the characteristics (e.g., outer wall 320 thickness, volume of chambers 322, 324, volume of cooling channel 328, and so on) of HGP component 300A, 300B.

With reference to FIGS. 17 and 18, the flow path of HPF and LPF through HGP component 300A, 300B may be discussed herein. Specifically in FIGS. 17 and 18, the flow direction of the fluid may be represented by arrows and may be labeled as "HPF" and "LPF."

In the non-limiting example, HPF may flow from area 50, through a portion of turbine blade 38 and/or stator vane 40 (see, FIG. 16), and into high pressure fluid chamber 322 extending through and/or formed in HGP component 300A, 300B. From high pressure fluid chamber 322, the HPF may flow through the plurality of high pressure nozzles 330 formed through inner wall 312. In the non-limiting example where high pressure nozzles 330 are aligned and/or concentric with low pressure venturi 332 extending through intermediate wall 318, the HPF may flow directly into and/or through the low pressure venturi 332 formed through intermediate wall 318. The HPF may mix with and substantially energize or increase the velocity of the LPF also flowing through low pressure venturi 332. The HPF may flow through the low pressure venturi 332, may be diffused by diffuser 336 of intermediate wall 318, and may flow to cooling channel 328 of HGP component 300A, 300B. Once inside cooling channel 328, the mixture of HPF and LPF may substantially cool outer wall 320 of HGP component 300A, 300B and may flow through cooling channel 328 toward and subsequently exhausted from cooling holes 340, 342 of HGP component 300A, 300B.

Simultaneous to and/or independent of the HPF flowing through HGP component 300A, 300B, LPF may be provided to and flow through HGP component 300A, 300B as well. LPF may flow from area 52, through a portion of turbine blade 38 and/or stator vane 40 (see, FIG. 16), and into low pressure fluid chamber 324 extending through and/or formed in HGP component 300A, 300B. Once provided to low pressure fluid chamber 324, the LPF may flow through the plurality of low pressure venturi 332 formed through intermediate wall 318. In the non-limiting example where section 334 (see, FIG. 18) of high pressure nozzles 330 extends into low pressure venturi 332, section 334 of high pressure nozzles 330 may direct the LPF through low pressure venturi 332. Additionally where high pressure nozzles 330 are aligned and/or concentric with low pressure venturi 332 the LPF may flow directly into low pressure venturi 332 and may mix with the HPF and substantially be charged or experience an increase in velocity when flowing through low pressure venturi 332. Similar to the HPF, the LPF may flow through the low pressure venturi 332, may be diffused by diffuser 336 of intermediate wall 318, and may flow to cooling channel 328 of HGP component 300A, 300B. Once inside cooling channel 328, the LPF, along with the HPF, may substantially cool outer wall 320 of HGP component 300A, 300B before being exhausted from HGP component via cooling holes 340, 342 in fluid communication with cooling channel 328 (see, FIG. 17).

As shown in FIG. 17, HGP component 300A, 300B may include additional features and/or portions that may be similar to those discussed herein. That is, body 302 of HGP component 300A, 300B may include additional features and/or portions positioned adjacent trailing edge 306 that may be substantially similar to those features and/or portions positioned adjacent leading edge 304. For example, HGP component 300A, 300B shown in FIG. 17 may include distinct walls 344, 346 formed adjacent trailing edge 306 that may define various chambers 348, 350 and/or channels 352 within body 302 of HGP component 300A, 300B. Specifically, body 302 of HGP component 300A, 300B may also include a second or distinct inner wall 344 defining a second or distinct high pressure fluid chamber 348, a second or distinct intermediate wall 346 surrounding inner wall 344 to define a low pressure fluid chamber 350, and outer wall 320 surrounding intermediate wall 346 to define a second or distinct cooling channel 352. Additionally as shown in FIG. 17, distinct inner wall 344 may include a plurality of high pressure nozzles 330 extending or formed therethrough and distinct intermediate wall 346 may include a plurality of low pressure venturi 332 extending or formed therethrough, as similarly discussed herein with respect to inner wall 312 and intermediate wall 320. It is understood that similarly named components or features (e.g., inner wall 312 and distinct inner wall 344, intermediate wall 320 and distinct intermediate wall 346, high pressure fluid chamber 330 and distinct high pressure fluid chamber 348, and the like) may function in a substantially similar fashion. Redundant explanation of these components has been omitted for clarity.

Also substantially similar to those features and/or portions positioned adjacent leading edge 304, HGP component 300A, 300B may include additional and/or distinct cooling holes 354, 356. Similar to cooling hole(s) 340, 342, cooling hole(s) 354, 356 may be formed and/or extend through outer wall 320. In the non-limiting example, cooling hole 354 may extend through outer wall 320 on pressure side 308 of body 302 of HGP component 300A, 300B, and cooling hole 356 may extend through outer wall 320 on suction side 310. Additionally, cooling hole(s) 354, 356 may be formed and/or may extend through outer surface 326 of outer wall 320 of body 302. Cooling hole(s) 354, 356 may be fluidly coupled and/or in fluid communication with cooling channel 352. As similarly discussed herein with respect to cooling holes 340, 342, cooling fluid (e.g., HPF, LPF) may flow through cooling channel 352 before being exhausted from HGP component 300A, 300B via cooling holes 354, 356 in fluid communication with cooling channel 352.

In the non-limiting example, HGP component 300A, 300B may also include a trailing edge cooling hole 358. Trailing edge cooling hole 358 may be formed and/or extending through outer wall 320. Specifically, trailing edge cooling hole 358 may extend through outer wall 320 between pressure side 308 and suction side 310 of body 302 of HGP component 300A, 300B, and may extend and/or be formed through (or adjacent) trailing edge 306 of HGP component 300A, 300B. Additionally, trailing edge cooling hole 358 may be formed and/or may extend through outer surface 326 of outer wall 320 of body 302. Trailing edge cooling hole 358 may also be fluidly coupled and/or in fluid communication with cooling channel 352. Similar to cooling holes 354, 356, cooling fluid (e.g., HPF, LPF) may flow through cooling channel 352 before being exhausted from HGP component 300A, 300B via trailing edge cooling hole 358 in fluid communication with cooling channel 352.

Additionally in the non-limiting example shown in FIG. 17, HGP component 300A, 300B may include a sectioning wall 360. More specifically, body 302 of HGP component 300A, 300B may include sectioning wall 360 formed integral with and/or surrounded by outer wall 320. As shown in FIG. 17, sectioning wall 360 may extend and/or may be formed between pressure side 308 and suction side 310 of HGP component 300A. 300B, as well as be positioned or formed within body 302 between leading edge 304 and trailing edge 306. Sectioning wall 360 may also extend between and separate cooling channel 328 and distinct cooling channel 352 formed in HGP component 300A, 300B.

Although two separate sets of cooling configurations (e.g., inner walls, intermediate walls, high pressure fluid chambers, low pressure fluid chambers, cooling channels, cooling holes, and the like) are shown formed in HGP component 300A, 300B, it is understood that the number of cooling configurations and components forming the same in HGP component 300A, 300B is merely illustrative. As such, HGP component 300A, 300B may include more or less cooling configurations and/or walls, chambers, and/or cooling channels. The number of features or components forming the cooling configurations in HGP component 300A, 300B may depend at least in part on various parameters (e.g., exposure temperature, exposure pressure, position/stage within turbine casing 36, HPF operational pressure/temperature, LPF operational pressure/temperature, and the like) of gas turbine system 10 during operation. Additionally, or alternatively, the number of features or components forming the cooling configurations in HGP component 300A, 300B may be dependent, at least in part on the characteristics (e.g., outer wall 320 thickness, volume of chambers 322, 324, 348, 350, volume of cooling channel 328, 352, and so on) of HGP component 300A, 300B.

Figure 19:
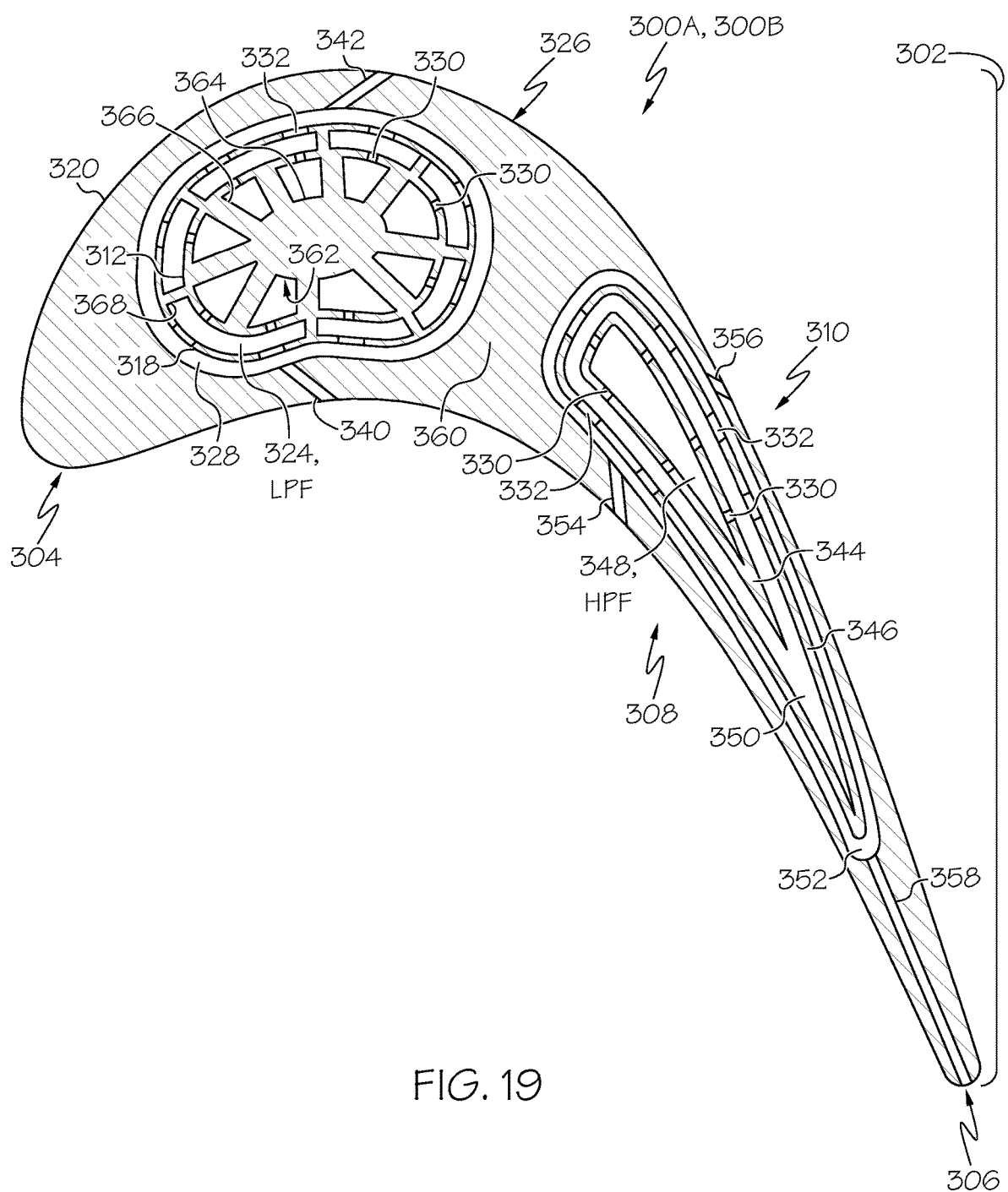
FIG. 19 shows a top cross-sectional view of the airfoil of the turbine blade or stator vane of shown in FIG. 16, taken along line CS-CS, according to additional embodiments of the disclosure.
Figure 20:
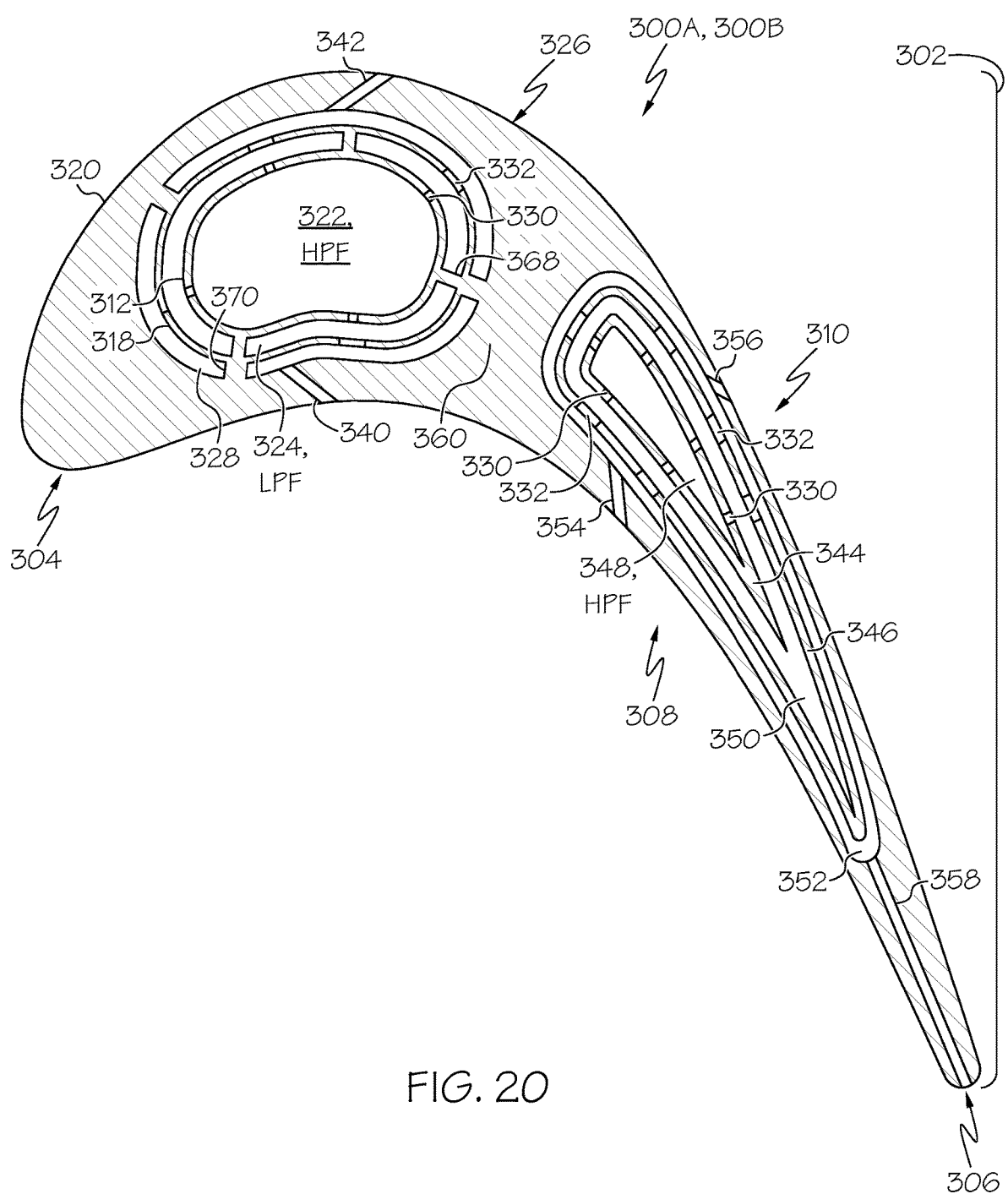
FIG. 20 shows a top cross-sectional view of the airfoil of the turbine blade or stator vane of shown in FIG. 16, taken along line CS-CS, according to further embodiments of the disclosure.

FIGS. 19 and 20 show top, cross-sectional views of additional non-limiting examples of HGP component 300A, 300B. The non-limiting examples of HGP components 300A, 300B shown in FIGS. 19 and 20 may include additional features and/or components when utilized in turbine 28, as discussed herein. It is understood that similarly numbered and/or named components may function in a substantially similar fashion. Redundant explanation of these components has been omitted for clarity.

As shown in FIG. 19, HGP component 300A, 300B may include at least one support 362. Support 362 may, for example, be positioned within high pressure fluid chamber 322 of HGP component 300A, 300B. Support 362 may provide support, structure, and/or rigidity to HGP component 300A, 300B, and more specifically, to at least inner wall 312 of body 302 for HGP component 300A, 300B. Additionally, support 362 may also prevent or substantially reduce vibration of HGP component 300A, 300B including the various internal chambers 322, 324, and channels 328 during operation. In the non-limiting example, support 362 may include a first segment 364 that may be positioned within and extend (radially) through high pressure fluid chamber 322. First segment 364 of support may be positioned adjacent to, separated from, and/or surrounded by inner wall 312. Support 362 may also include at least one distinct or second segment 366 positioned within high pressure fluid chamber 322. Second segment(s) 366 may extend between first segment 364 and inner wall 312 of HGP component 300A, 300B. Specifically, second segment(s) 366 of support 362 may extend between and contact and/or be coupled, affixed, or formed integral with inner wall 312 to couple and/or join first segment 364 of support 362 to inner wall 312 of HGP component 300A, 300B.

In a non-limiting example, support 362 may be formed integral with body 302 of HGP component 300A, 300B. More specifically, support 362 including first segment 364 and second segment(s) 366 may be formed integral with body 302 including inner wall 312. Support 362 may be formed with body 302/inner wall 312 when forming unitary body 302 of HGP component 300A, 300B using any suitable additive manufacturing process(es) and/or method, as discussed herein. Alternatively, only one of the segments (e.g., first segment 364) or no portion of support 362 may be formed integral with body 302/inner wall 312 of HGP component 300A, 300B. In these non-limiting examples, the segments not formed integral with body 302 may be formed individually and/or separately using any suitable manufacturing process including, but not limited to, milling, turning, cutting, casting, molding, drilling, and the like. Additionally, the separately formed segments 364, 366, or alternatively the entirety of support 362, may be joined, coupled, and/or affixed to one another and subsequently joined, coupled, and/or affixed to body 302/inner wall 312 of HGP component 300A, 300B using any suitable joining process or technique including, but not limited to, welding, fastening, melting, sintering, brazing, and the like.

Additionally as shown in FIG. 19, HGP component 300A, 300B may also include at least one support pin 368. In the non-limiting example, a plurality of support pins 368 may be positioned and/or extend between inner wall 312 and intermediate wall 318, and be positioned within low pressure fluid chamber 324. Additionally, each of the plurality of support pins 368 may also contact and/or be coupled, affixed, or formed integral with inner wall 312 and intermediate wall 318, respectively, of HGP component 300A, 300B. Similar to support 362, the inclusion of the plurality of support pins 368 within HGP component 300A, 300B may provide additional or improved support, structure, and/or rigidity to inner wall 312 and intermediate wall 318 of HGP component 300A, 300B, and may substantially prevent vibration of HGP component 300A, 300B during operation of gas turbine system 10. In addition to providing support, structure, and/or rigidity to portions of HGP component 300A, 300B, the plurality of support pins 368 positioned within low pressure fluid chamber 324 may also aid in the heat transfer and/or cooling of HGP component 300A, 300B during operation of gas turbine system 10 (see, FIG. 16), as discussed herein. In a non-limiting example, the plurality of support pins 368 may be formed integral with inner wall 312, and/or intermediate wall 318 when forming unitary body 302 of HGP component 300A, 300B using any suitable additive manufacturing process(es) and/or method, as discussed herein. Alternatively, support pins 368 may be formed individually and/or separately using any suitable manufacturing process, and subsequently may be joined, coupled, and/or affixed to inner wall 312 and intermediate wall 318 of HGP component 300A, 300B using any suitable joining process or technique.

As shown in FIG. 19, the distinct cooling configuration formed adjacent trailing edge 306 may not include support 362 and the plurality of support pins 368. That is, support 362 may be positioned only within and/or extend through high pressure fluid chamber 322. In other non-limiting examples, HGP component 300A, 300B may include support 362 and/or the plurality of support pins 368 in all cooling configurations (e.g., leading edge cooling configuration including high pressure fluid chamber 322 and trailing edge cooling configuration including high pressure fluid chamber 348).

Although shown as only formed between inner wall 312 and intermediate wall 318, HGP component 300A, 300B, may include additional support pins 368 formed in other portions and/or between additional walls of body 302. In the non-limiting example shown in FIG. 20, HGP component 300A, 300B may include a first plurality of support pins 368 formed or positioned between inner wall 312 and intermediate wall 318 as similarly discussed herein with respect to FIG. 19. Additionally in the non-limiting example, HGP component 300A, 300B may include a second plurality of support pins 370 positioned and/or extending between intermediate wall 318 and outer wall 320, and positioned within cooling channel 328. Additionally, each of the second plurality of support pins 370 may also contact and/or be coupled, affixed, or formed integral with intermediate wall 318 and outer wall 320, respectively, of HGP component 300A, 300B. Similar to the first plurality of support pins 368, the second plurality of support pins 370 included within HGP component 300A, 300B may provide additional or improved support, structure, and/or rigidity to intermediate wall 318 and outer wall 320 of HGP component 300A, 300B, and may substantially prevent vibration of HGP component 300A, 300B during operation of gas turbine system 10. In addition to providing support, structure, and/or rigidity to portions of HGP component 300A, 300B, the second plurality of support pins 370 positioned within cooling channel 328 may also aid in the heat transfer and/or cooling of HGP component 300A, 300B during operation of gas turbine system 10 (see, FIG. 16), as discussed herein.

Also similar to first plurality of support pins 368, the second plurality of support pins 370 may be formed integral with intermediate wall 318 and/or outer wall 320 when forming unitary body 302 of HGP component 300A, 300B using any suitable additive manufacturing process(es) and/or method, as discussed herein. Alternatively, support pins 370 may be formed individually and/or separately using any suitable manufacturing process, and subsequently may be joined, coupled, and/or affixed to intermediate wall 318 and/or outer wall 320 of HGP component 300A, 300B using any suitable joining process or technique.

The size, shape, and/or number of support pins 368, 370 positioned or formed within HGP component 300A, 300B, as shown in FIGS. 19 and 20, is merely illustrative. As such, HGP component 300A, 300B may include larger or smaller support pins 368, 370, varying sized support pins 368, 370, and/or may include more or less support pins 368, 370 formed therein. The size, shapes, and/or number of support pins 368, 370 formed in HGP component 300A, 300B may be dependent, at least in part on the operational characteristics (e.g., exposure temperature, exposure pressure, position within turbine casing 36, and the like) of gas turbine system 10 during operation. Additionally, or alternatively, the size, shapes, and/or number of support pins 368, 370 formed in HGP component 300A, 300B may be dependent, at least in part on the characteristics (e.g., inner wall 312/intermediate wall 318/outer wall 320 thickness, volume of chambers 322, 324, volume of cooling channel 328 and so on) of HGP component 300A, 300B.

Figure 21:
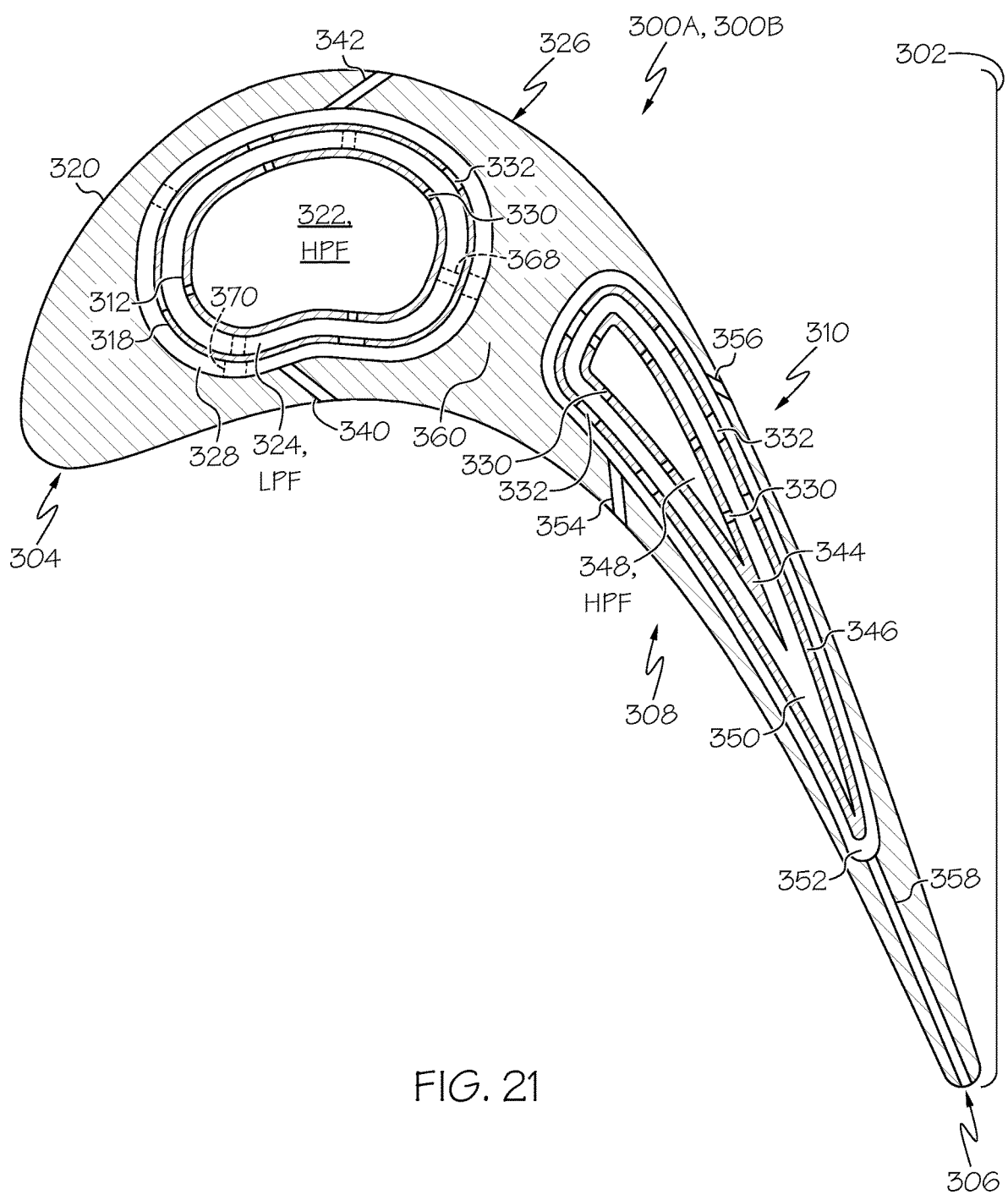
FIG. 21 shows a top cross-sectional view of the airfoil of the turbine blade or stator vane of shown in FIG. 16, taken along line CS-CS, according to another embodiment of the disclosure.

FIG. 21 shows a top, cross-sectional view of another non-limiting example of HGP component 300A, 300B. The non-limiting example of HGP components 300A, 300B shown in FIG. 21 may include distinct features and/or components than other non-limiting examples discussed herein. It is understood that similarly numbered and/or named components may function in a substantially similar fashion. Redundant explanation of these components has been omitted for clarity.

For example, and as discussed herein, HGP component 300A, 300B may not be formed from a unitary body 302. Rather, HGP component 300A, 300B may be formed from various distinct parts. More specifically, inner wall 312 and intermediate wall 318 of HGP component 300A, 300B may be formed from distinct parts and/or may be formed distinct from outer wall 320 of HGP component 300A, 300B. In the non-limiting shown in FIG. 21, inner wall 312 and intermediate wall 318 may be formed individually and/or separate from outer wall 320, and may interested into and subsequently joined, coupled, and/or affixed to body 302 or outer wall 320 to form HGP component 300A, 300B. Inner wall 312 and intermediate wall 318 may be joined, coupled, and/or affixed to various portions of HGP component 300A, 300B and/or blade 38, for example, platform 47 or tip section 48. In another non-limiting example, inner wall 312 may be coupled to intermediate wall 318 via the first plurality of support pins 368 (shown in phantom), and/or intermediate wall 318 may be coupled to outer wall 320 via the second plurality of support pins 370 (shown in phantom), as similarly discussed herein with respect to FIG. 20. The inclusion and joining of separate part inner wall 312 and intermediate wall 318 with body 302 or outer wall 320 may form and define high pressure fluid chamber 322, low pressure fluid chamber 324, and cooling channel 328, as discussed herein.

In the non-limiting example shown in FIG. 21, inner wall 312 and intermediate wall 318 may be formed from distinct materials than outer wall 320 of HGP component 300A, 300B. For example, inner wall 312 and intermediate wall 318 may be formed from a first metal or alloy having a first set of material properties and/or characteristics (e.g., melting point, heat transfer characteristics, hardness, ductility, and the like), while outer wall 320 may be formed from a second metal or allow having a second set of material properties and/or characteristics. Alternatively, each of inner wall 312, intermediate wall 318, and outer wall 320 may be formed from distinct materials, where each material has unique material properties and/or characteristics. In another non-limiting example, inner wall 312, intermediate wall 318, and outer wall 320 may be formed from identical materials, but still formed individually and/or separately. Each of inner wall 312, intermediate wall 318, and outer wall 320 may each be formed individually and/or separately using any suitable manufacturing process including, but not limited to additive manufacturing, milling, turning, cutting, casting, molding, drilling, and the like. Additionally, inner wall 312, intermediate wall 318, and outer wall 320 may be joined, coupled, and/or affixed to one another to form HGP component 300A, 300B using any suitable joining process or technique including, but not limited to, welding, fastening, melting, sintering, brazing, and the like.

By utilizing support 102, 202 and/or HGP component 100, 200, 300A, 300B as discussed herein with respect to FIGS. 2-21, turbine 28 of gas turbine system 10 may utilize both HPF and LPF found within turbine 28 to cool HGP component 100, 200, 300A, 300B. Additionally, the ratio of HPF and LPF that may be used to cool HGP component 100, 200, 300A, 300B may include larger amounts of LPF than HPF.

Hot gas path (HGP) component 100, 200 and support 102, 202 (see, FIGS. 2-15, respectively), and HGP components 300A, 300B or airfoils 42, 46 of turbine 28 (see, FIGS. 16-21) may be formed in a number of ways. In one embodiment, HGP component 100, 200, 300A, 300B and/or support 102, 202 may be made by casting. However, as noted herein, additive manufacturing is particularly suited for manufacturing HGP component 100, 200 including unitary body 110, support 102, 202, and HGP component 300A, 300B including unitary body 302. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM or SLM have been found advantageous.

Figure 22:
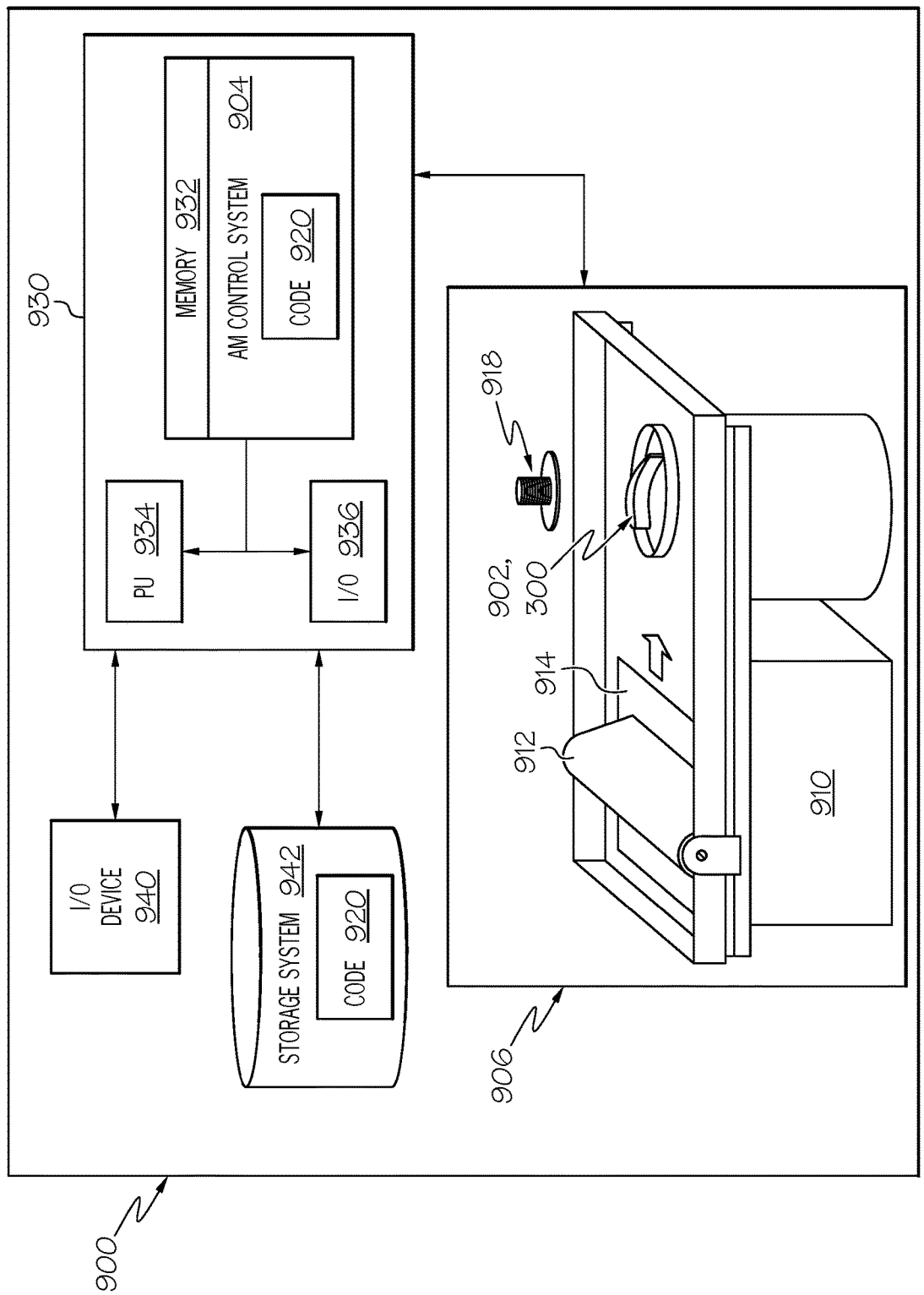
FIG. 22 shows a block diagram of an additive manufacturing process including a non-transitory computer readable storage medium storing code representative of a hot gas path component according to embodiments of the disclosure.

To illustrate an example of an additive manufacturing process, FIG. 22 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as airfoils 42, 46 or HGP components 300A, 300B (see, FIGS. 12-17), but may also include HGP component 100 (see, FIGS. 2-13) and/or HGP component 200 (see, FIGS. 14 and 15). AM system 900 generally includes a computerized additive manufacturing (AM) control system 904 and an AM printer 906. AM system 900, as will be described, executes code 920 that includes a set of computer-executable instructions defining airfoils 42, 46 to physically generate the object 902 using AM printer 906. Each AM process may use different raw materials in the form of, for example, fine-grain powder, liquid (e.g., polymers), sheet, etc., a stock of which may be held in a chamber 910 of AM printer 906. In the instant case, airfoils 42, 46 may be made of a metal or metal compound capable of withstanding the environment of gas turbine system 10 (see, FIG. 1). As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where a metal binder jetting process is used. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of HGP component 100, described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of HGP component 100. As noted, code 920 includes a set of computer-executable instructions defining outer electrode that can be used to physically generate the tip, upon execution of the code by system 900. For example, code 920 may include a precisely defined 3D model of HGP component 100 and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing HGP component 100 into a series of thin slices that it assembles using AM printer 906 in successive layers of liquid, powder, sheet or other material. In the DMLM example, each layer is melted to the exact geometry defined by code 920 and fused to the preceding layer. Subsequently, airfoils 42, 46 may be exposed to any variety of finishing processes, e.g., those described herein for re-contouring or other minor machining, sealing, polishing, etc.

Technical effects of the disclosure include, e.g., providing a turbine blade and/or stator vane airfoil that includes a plurality nozzles and venturi formed therein. The body of the airfoils (formed using additive manufacturing) allows for the formation of various layers of nozzles/venturi and the utilization of low pressure fluid in cooling the component. This results in a reduced amount of fluid required to cool the airfoils, which in turn reduces fuel consumption and/or heat rate within the turbine system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An airfoil comprising:
   a body including:
   an inner wall defining a high pressure fluid chamber;
   a plurality of high pressure nozzles extending through the inner wall, each of the plurality of high pressure nozzles in fluid communication with the high pressure fluid chamber;
   an intermediate wall positioned adjacent to and surrounding the inner wall to define a low pressure fluid chamber formed between the intermediate wall and the inner wall;
   a plurality of low pressure venturi extending through the intermediate wall, each of the plurality of low pressure venturi in fluid communication with the low pressure fluid chamber; and
   an outer wall positioned adjacent to and surrounding the intermediate wall to define a cooling channel formed between the intermediate wall and the outer wall.

2. The airfoil of claim 1, wherein each of the plurality of high pressure nozzles are in fluid communication with the low pressure fluid chamber to provide a high pressure fluid from the high pressure fluid chamber to the low pressure fluid chamber.

3. The airfoil of claim 1, wherein each of the plurality of low pressure venturi are in fluid communication with the cooling channel to provide a low pressure fluid from the low pressure fluid chamber to the cooling channel.

4. The airfoil of claim 1, wherein the plurality of high pressure nozzles extending through the inner wall are in fluid communication with the plurality of low pressure venturi extending through the intermediate wall to provide a high pressure fluid from the high pressure fluid chamber to the plurality of low pressure venturi.

5. The airfoil of claim 1, wherein each of the plurality of high pressure nozzles are aligned with a corresponding low pressure venturi of the plurality of low pressure venturi.

6. The airfoil of claim 1, further comprising at least one cooling hole extending through the outer wall, the at least one cooling hole in fluid communication with the cooling channel.

7. The airfoil of claim 1, wherein at least one of the inner wall or the intermediate wall are formed integral with the outer wall.

8. The airfoil of claim 1, further comprising:
   a support positioned within the high pressure fluid chamber, the support including:
      a first segment extending radially through the high pressure fluid chamber; and
      at least one second segment extending between and contacting the first segment and the inner wall.

9. The airfoil of claim 8, further comprising at least one of:
   a first plurality of support pins extending between and contacting the inner wall and the intermediate wall, or
   a second plurality of support pins extending between and contacting the intermediate wall and the outer wall.

10. The airfoil of claim 1, further comprising at least one of:
    a first plurality of support pins extending between and contacting the inner wall and the intermediate wall, or
    a second plurality of support pins extending between and contacting the intermediate wall and the outer wall.

11. The airfoil of claim 10, wherein the inner wall, the intermediate wall, and the plurality of support pins are formed as a unitary component.

12. The airfoil of claim 1, wherein:
    each of the plurality of high pressure nozzles extending through the inner wall have a first dimension; and
    each of the plurality of low pressure venturi extending through the intermediate wall have a second dimension that is greater than the first dimension.

13. The airfoil of claim 12, wherein each of the plurality of low pressure venturi further include:
    a plurality of diffusers, each one of the plurality of diffusers formed integral with a corresponding low pressure venturi of the plurality of low pressure venturi, adjacent the cooling channel.

14. The airfoil of claim 13, wherein each of the plurality of diffusers includes a third dimension, the third dimension being greater than the second dimension of the plurality of low pressure venturi.

15. The airfoil of claim 1, wherein a section of each of the plurality of high pressure nozzles extends within a corresponding low pressure venturi.

16. An airfoil comprising:
    a body including:
    a first inner wall defining a first high pressure fluid chamber;
    a first plurality of high pressure nozzles extending through the first inner wall, each of the first plurality of high pressure nozzles in fluid communication with the first high pressure fluid chamber;
    a first intermediate wall positioned adjacent to and surrounding the first inner wall to define a first low pressure fluid chamber between the first intermediate wall and the first inner wall;
    a first plurality of low pressure venturi extending through the first intermediate wall, each of the first plurality of low pressure venturi in fluid communication with the first low pressure fluid chamber;
    a second inner wall surrounding and defining a second high pressure fluid chamber, the second inner wall positioned adjacent the first inner wall;

a second plurality of high pressure nozzles extending through the second inner wall, each of the second plurality of high pressure nozzles in fluid communication with the second high pressure fluid chamber;

a second intermediate wall positioned adjacent to and surrounding the second inner wall to define a second low pressure fluid chamber formed between the second intermediate wall and the second inner wall;

a second plurality of low pressure venturi extending through the second intermediate wall, each of the second plurality of low pressure venturi in fluid communication with the second low pressure fluid chamber;

an outer wall positioned adjacent to and surrounding:
 the first intermediate wall to define a first cooling channel formed between the first intermediate wall and the outer wall; and
 the second intermediate wall to define a second cooling channel formed between the second intermediate wall and the outer wall; and a sectioning wall extending between and separating the first cooling channel and the second cooling channel, the sectioning wall surrounded by the outer wall.

17. The airfoil of claim 16, the body further including:
 a first cooling hole extending through the outer wall, the first cooling hole in fluid communication with the first cooling channel; and
 a second cooling hole extending through the outer wall, the second cooling hole in fluid communication with the second cooling channel.

18. The airfoil of claim 16, wherein at least one of the first inner wall, the first intermediate wall, the second inner wall, or the second intermediate wall are formed integral with the outer wall.

19. The airfoil of claim 16, further comprising:
 a support positioned within the high pressure fluid chamber, the support including:
  a first segment extending radially through the high pressure fluid chamber; and
  at least one second segment extending between and contacting the first segment and the inner wall.

20. The airfoil of claim 19, further comprising at least one of:
 a first plurality of support pins extending between and contacting the inner wall and the intermediate wall, or
 a second plurality of support pins extending between and contacting the intermediate wall and the outer wall.

* * * * *